United States Patent
Morishima

(10) Patent No.: US 8,290,731 B2
(45) Date of Patent: *Oct. 16, 2012

(54) CALIBRATION METHOD FOR INERTIAL DRIVE ACTUATOR, INERTIAL DRIVE ACTUATOR DEVICE, AND METHOD OF CALCULATING POSITION OF MOVING BODY

(75) Inventor: Tetsuya Morishima, Hachioji (JP)

(73) Assignee: Olympus Corporation, Tokyo (JP)

( * ) Notice: Subject to any disclaimer, the term of this patent is extended or adjusted under 35 U.S.C. 154(b) by 234 days.

This patent is subject to a terminal disclaimer.

(21) Appl. No.: 12/723,923

(22) Filed: Mar. 15, 2010

(65) Prior Publication Data

US 2010/0241382 A1 Sep. 23, 2010

(30) Foreign Application Priority Data

Mar. 17, 2009 (JP) .................. 2009-063996

(51) Int. Cl.
*G01D 18/00* (2006.01)
*G06F 11/00* (2006.01)
(52) U.S. Cl. .......... 702/88; 702/117; 702/182; 702/188
(58) Field of Classification Search ............. 702/88, 702/117–123, 182–190
See application file for complete search history.

(56) References Cited

U.S. PATENT DOCUMENTS 7,902,724 B2 * 3/2011 Matsuki ................. 310/328
2007/0241640 A1 * 10/2007 Matsuki ................. 310/323.01

FOREIGN PATENT DOCUMENTS

JP 2003-185406 7/2003

* cited by examiner

*Primary Examiner* — Phuong Huynh
(74) *Attorney, Agent, or Firm* — Scully, Scott, Murphy & Presser, P.C.

(57) ABSTRACT

A method includes an electrostatic capacitance detecting step of detecting electrostatic capacitances of opposing parts of a moving body side electrode and an oscillating plate electrode; an electrostatic capacitance storing step of storing the electrostatic capacitances at the first movement limit position and the second movement limit position detected at the electrostatic capacitance detecting step; a ratio calculating step of calculating a ratio of the electrostatic capacitances at the first movement limit position and the second movement limit position stored at the electrostatic capacitance storing step to a movement limit distance that is a distance between the first movement limit position and the second movement limit position; and an absolute position calculating step of calculating an absolute position of the moving body between the first movement limit position and the second movement limit position from the ratio.

14 Claims, 21 Drawing Sheets

600

CALIBRATION METHOD FOR INERTIAL DRIVE ACTUATOR, INERTIAL DRIVE ACTUATOR DEVICE, AND METHOD OF CALCULATING POSITION OF MOVING BODY

CROSS-REFERENCE TO RELATED APPLICATIONS

The present application is based upon and claims the benefit of priority from the prior Japanese Patent Application No. 2009-063996 filed on Mar. 17, 2009; the entire contents of which are incorporated herein by reference.

BACKGROUND OF THE INVENTION

1. Field of the Invention

The present invention relates to a calibration method for inertial drive actuator, an inertial drive actuator device, and a method of calculating a position of a moving body.

2. Description of the Related Art

FIG. 20 is a side-view depicting the structure of a conventional actuator 920. As shown in FIG. 20, the actuator 920 includes a piezoelectric element 911, which is a type of electromechanical converting element, a drive shaft 912, a moving body 913 that is friction-coupled to the drive shaft 912, and a frame 914 of the actuator 920. One end of the piezoelectric element 911 is fixed to the frame 914 while the other end of the piezoelectric element 911 is fixed to the drive shaft 912.

A detecting member 921 that is fixed to the frame 914 constitutes a fixed electrode for detecting a position of the moving body 913 based on an electrostatic capacitance. The detecting member 921 is disposed parallel to a direction of movement of the moving body 913 in a contactless manner. The drive shaft 912, the moving body 913, and the detecting member (fixed electrode) 921 are made of a conductive material. The surface of the detecting member 921 that opposes the moving body 913 constitutes an electrode 921. The electrode 921 and the moving body 913 are arranged with a gap D therebetween and they constitute a capacitor having an electrostatic capacitance C.

FIG. 21 is a plan-view depicting the structure of the detecting member 921 and the relationship between the detecting member 921 and the moving body 913. As shown in FIG. 21, the detecting member 921 includes a first electrode 921a and a second electrode 921b arranged on an insulation member 921p. Each of the first electrode 921a and the second electrode 921b has a shape of a right-angled triangle. The first electrode 921a and the second electrode 921b are arranged in such a way that their oblique sides are adjacent to each other. A driving waveform output from a driving circuit 918 (see FIG. 20) is applied to the piezoelectric element 911 and also to the moving body 913 via the drive shaft 912.

As in an exemplary state shown in FIG. 21, the moving body 913 and the first electrode 921a face each other and are coupled by electrostatic-capacitive coupling. Similarly, the moving body 913 and the second electrode 921b face each other and they are coupled by an electrostatic-capacitive coupling. As a result, the driving waveform applied to the moving body 913 flows toward the first electrode 921a and the second electrode 921b. A current i flowing toward the first electrode 921a and the second electrode 921b is detected by a detecting circuit 919 the value of the current i is input into a control circuit 917.

As an example, a case is explained here in which the moving body 913 moves in the direction of an arrow a (see FIG. 21) from the first electrode 921a toward the second electrode 921b. Because of the movement of the moving body 913, while on one hand an opposing electrode surface area between the moving body 913 and the first electrode 921a decreases gradually leading to a gradual decrease in an electrostatic capacitance Ca between the two, on the other hand an opposing electrode surface area between the moving body 913 and the second electrode 921b increases gradually leading to a gradual increase in an electrostatic capacitance Cb between the two. Consequently, as the moving body 913 moves, a current is flowing from the moving body 913 to the first electrode 921a decreases gradually, and a current ib flowing from the moving body 913 to the second electrode 921b increases gradually.

On the other hand, when the moving body 913 moves in the opposite direction of the arrow a, from the second electrode 921b toward the first electrode 921a, while on one hand the opposing electrode surface area between the moving body 913 and the first electrode 921a increases gradually leading to a gradual increase in the electrostatic capacitance Ca between the two, on the other hand the opposing electrode surface area between the moving body 913 and the second electrode 921b decreases gradually leading to a gradual decrease in the electrostatic capacitance Cb between the two. Consequently, as the moving body 913 moves, the current ia flowing from the moving body 913 to the first electrode 921a increases gradually, and the current ib flowing from the moving body 913 to the second electrode 921b decreases gradually.

Thus, the position of the moving body 913 in relation to the detecting member 921 can be determined by comparing the amounts of the currents ia and ib that increase and decrease with the movement of the moving body 913. In addition, the direction of movement of the moving body 913 can be determined based on whether the currents ia and ib increase or decrease.

Such an actuator is disclosed, for example, in Japanese Patent Application Laid-open No. 2003-185406.

However, with use, due to factors such as humidity, temperature, gravity, and aging, the detected value of the electrostatic capacitance of the actuator 920 tends to differ from the initial value of the actuator 920 detected at the time of its assembly. Consequently, if the relationship between the electrostatic capacitance and the position data collected at the time of assembly of the actuator 920 is applied to the actual electrostatic capacitance (current), the position of the moving body 913 in relation to the detecting member 921 cannot be determined accurately.

SUMMARY OF THE INVENTION

The present invention has been made in view of the above discussion and has an object to provide a technique for correcting, even if an electrostatic capacitance between a moving body and an electrode differs at a later stage after the assembly of the actuator, the electrostatic capacitance to an appropriate value to allow an absolute position of the moving body to be reliably and accurately calculated.

To solve the above problems and to achieve the above object, according to an aspect of the present invention, a calibration method for inertial drive actuator of driving a moving body to move by inertia between a first movement limit position and a second movement limit position in relation to an oscillating plate that is moved to reciprocate by a moving member, and detecting a position of the moving body based on an electrostatic capacitance, includes steps of detecting in which, electrostatic capacitances of opposing parts of a moving body side electrode provided in the moving body and an oscillating plate electrode provided in the oscillating plate is detected at the first movement limit position and the second movement limit position, respectively; storing in which, the electrostatic capacitances at the first movement limit position and the second movement limit position detected at the detecting step are stored; and calculating in which, a ratio of a difference between the electrostatic capacitances at the first movement limit position and the second movement limit position stored at the storing step to a movement limit distance that is a distance between the first movement limit position and the second movement limit position is calculated, wherein it is made possible to calculate an absolute position of the moving body between the first movement limit position and the second movement limit position by using the ratio calculated at the calculating step.

In the calibration method for inertial drive actuator according to another aspect of the present invention, it is preferable that a position of the moving body in a movement range from the first movement limit position to the second movement limit position, and the electrostatic capacitances have a proportional relationship.

It is preferable that the calibration method for inertial drive actuator according to another aspect of the present invention includes step of comparing in which, the electrostatic capacitances stored at the storing step are compared.

In the calibration method for inertial drive actuator according to another aspect of the present invention, it is preferable that recalibration is induced when the electrostatic capacitance varies and an error is detected in a relationship between position data and the electrostatic capacitance even if the moving body is idle in absence of an input signal.

In the calibration method for inertial drive actuator according to another aspect of the present invention, it is preferable that a movement amount per driving waveform when the moving body is moved from the first movement limit position toward the second movement limit position and a movement amount per driving waveform when the moving body is moved from the second movement limit position toward the first movement limit position is measured or calculated, and one of the movement amount per driving waveforms is stored or both the movement amount per driving waveforms are stored separately.

In the calibration method for inertial drive actuator according to another aspect of the present invention, it is preferable that when calculating the movement amount per driving waveform, the moving body is moved at least once toward a center in a movement range from the first movement limit position to the second movement limit position.

In the calibration method for inertial drive actuator according to another aspect of the present invention, it is preferable that the oscillating plate electrode is provided in a plurality, and the position of the moving body is calculated by comparing or calculating electrostatic capacitances between the moving body side electrode and the respective oscillating plate electrodes.

In the calibration method for inertial drive actuator according to another aspect of the present invention, it is preferable that the oscillating plate electrode includes any one of a driving electrode and a position detecting electrode or both.

It is preferable that the calibration method for inertial drive actuator according to another aspect of the present invention includes a step of confirming in which, a calibration result is confirmed.

In the calibration method for inertial drive actuator according to another aspect of the present invention, it is preferable that recalibration is performed if it is confirmed at the confirming step that calibration is not performed correctly.

An inertial drive actuator device according to another aspect of the present invention includes an oscillating plate that is moved to reciprocate by a moving member; a driving circuit that applies a drive signal to the moving member; a moving body that moves by inertia in relation to the oscillating plate; projecting sections that regulate a movement limit distance of the moving body; an electrostatic capacitance detecting circuit that detects an electrostatic capacitance of an opposing portion of a moving body side electrode provided in the moving body and an oscillating plate electrode provided in the oscillating plate; an electrostatic capacitance storage unit that stores therein the electrostatic capacitance detected by the electrostatic capacitance detecting circuit; a ratio calculating unit that calculates a ratio of the electrostatic capacitance stored in the electrostatic capacitance storage unit and the movement limit distance; and an absolute-position calculating unit that calculates an absolute position of the moving body based on the electrostatic capacitance detected by the electrostatic capacitance detecting circuit and the ratio calculated by the ratio calculating unit.

In the inertial drive actuator device according to another aspect of the present invention, it is preferable that the moving body includes a conductive material.

In the inertial drive actuator device according to another aspect of the present invention, it is preferable that a permanent magnet is disposed on a side of the oscillating plate facing the moving body, and the moving body includes a magnetic material.

According to another aspect of the present invention, a method of calculating a position of a moving body in an inertial drive actuator of driving the moving body to move by inertia between a first movement limit position and a second movement limit position in relation to an oscillating plate that is moved to reciprocate by a moving member, and detecting a position of the moving body based on an electrostatic capacitance, includes steps of detecting in which, electrostatic capacitances of opposing parts of a moving body side electrode provided in the moving body and an oscillating plate electrode provided in the oscillating plate is detected at the first movement limit position and the second movement limit position, respectively; storing in which, the electrostatic capacitances at the first movement limit position and the second movement limit position detected at the detecting step are stored; calculating in which, a ratio of a difference between the electrostatic capacitances at the first movement limit position and the second movement limit position stored at the storing step to a movement limit distance that is a distance between the first movement limit position and the second movement limit position is calculated; and calculating in which, an absolute position of the moving body between the first movement limit position and the second movement limit position from the ratio calculated at the calculating is calculated.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an inertial drive actuator and an inertial drive actuator device according to the present invention are explained below with reference to the accompanying drawings. However, the invention is not limited to the embodiments explained below.

(First Embodiment)

Figure 1:
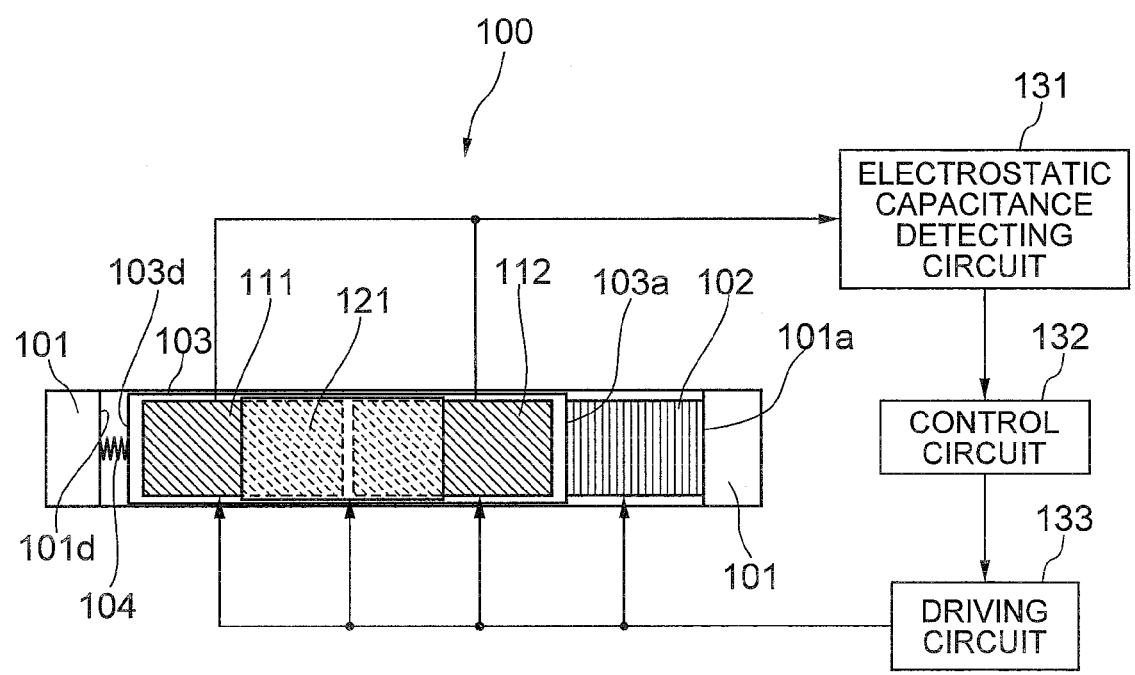
FIG. 1 is a plan-view depicting the structure of an inertial drive actuator device that includes an inertial drive actuator according to a first embodiment of the present invention.
Figure 2:
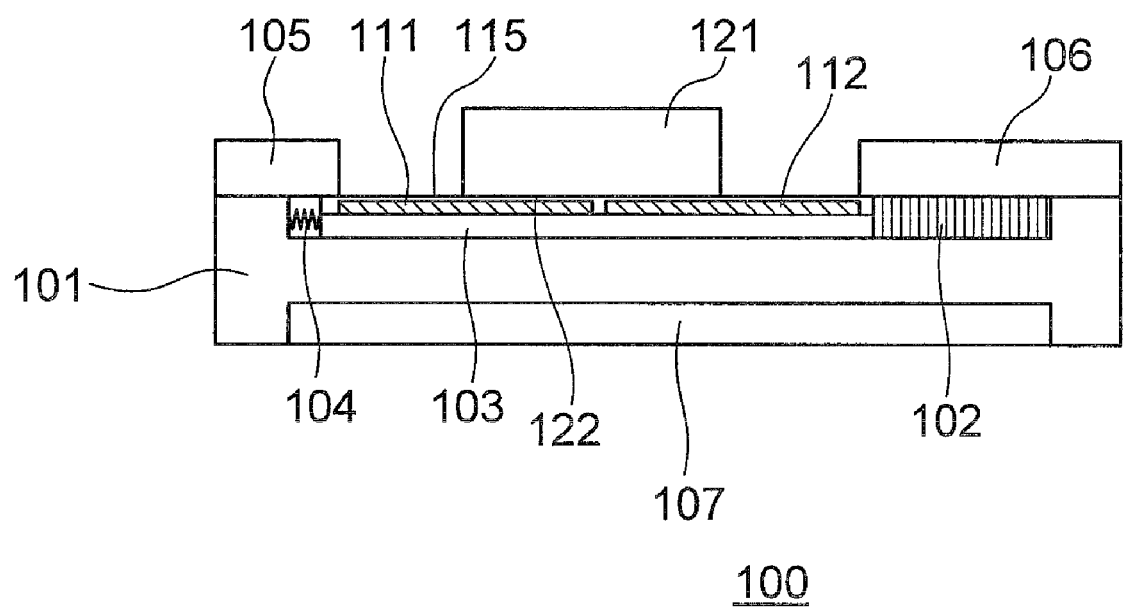
FIG. 2 is a side-view depicting the structure of the inertial drive actuator according to the first embodiment of the present invention.

The structure of an inertial drive actuator 100 according to a first embodiment is explained with reference to FIGS. 1 and 2. FIG. 1 is a plan-view depicting the structure of an inertial drive actuator device that includes the inertial drive actuator 100 according to the first embodiment of the present invention. FIG. 2 is a side-view depicting the structure of the inertial drive actuator 100. Attention is drawn to the fact that projecting sections 105 and 106 are not shown in FIG. 1. In the following explanation, the inertial drive actuator device includes the inertial drive actuator 100, an electrostatic capacitance detecting circuit 131 and a driving circuit 133 that are connected to the inertial drive actuator 100, and a control circuit 132.

The inertial drive actuator 100 includes a fixed member 101, a piezoelectric element 102, an oscillating plate 103 displaceably mounted on the fixed member 101, a spring 104, the projecting sections 105 and 106 formed on the fixed member 101, oscillating plate electrodes 111 and 112 disposed on the oscillating plate 103, and a moving body 121. A permanent magnet 107 is disposed below the fixed member 101.

One end of the piezoelectric element 102 is disposed adjacent to an inner surface 101a of the fixed member 101. The other end of the piezoelectric element 102 is disposed adjacent to a right hand side surface 103a of the oscillating plate 103.

The spring 104 is disposed so as to face the piezoelectric element 102 via the oscillating plate 103. In other words, one end of the spring 104 is disposed adjacent to an inner surface 101d of the fixed member 101 while the other end is disposed adjacent to a left hand side surface 103d of the oscillating plate 103.

In the inertial drive actuator 100, when the piezoelectric element 102 expands and because of which the oscillating plate 103 is displaced, the spring 104 supports the oscillating plate 103. On the contrary, when the piezoelectric element 102 contracts, the elastic force of the spring 104 causes the oscillating plate 103 to revert to its original position. In other words, the spring 104 assists to convey the expansion and contraction of the piezoelectric element 102 to the oscillating plate 103. A structure is allowable in which both ends of the piezoelectric element 102 and both ends of the spring 104 are fixed to any one of the fixed member 101 and the oscillating plate 103 or both.

The oscillating plate electrodes 111 and 112 are formed on the upper surface of the oscillating plate 103. Moreover, an insulation layer 115 is formed on the upper surface of the oscillating plate electrodes 111 and 112 (see FIG. 2). The moving body 121 is mounted on the oscillating plate electrodes 111 and 112, with the insulation layer 115 disposed therebetween. A moving body side electrode 122 is formed on the lower surface of the moving body 121, that is, on the surface that is in contact with the oscillating plate electrodes 111 and 112.

With the displacement of the oscillating plate 103, the moving body 121 is capable of moving slidingly in relation to the insulation layer 115 in a longitudinal direction (right and left directions in FIGS. 1 and 2) of the oscillating plate 103 having a rectangular shape. The moving body 121 should preferably be made of a magnetic material or a conductive material.

The driving circuit 133 is connected to each of the piezoelectric element 102, the oscillating plate electrodes 111 and 112, and the moving body side electrode 122 of the moving body 121. The driving circuit 133 applies a driving voltage to drive each of the piezoelectric element 102, the oscillating plate electrodes 111 and 112, and the moving body side electrode 122. Furthermore, the electrostatic capacitance detecting circuit 131 is connected to each of the oscillating plate electrodes 111 and 112. The electrostatic capacitance detecting circuit 131 detects an electrostatic capacitance between the moving body side electrode 122 of the moving body 121 and each of the oscillating plate electrodes 111 and 112. Signals output from the electrostatic capacitance detecting circuit 131 are input into the control circuit 132.

Figure 3:
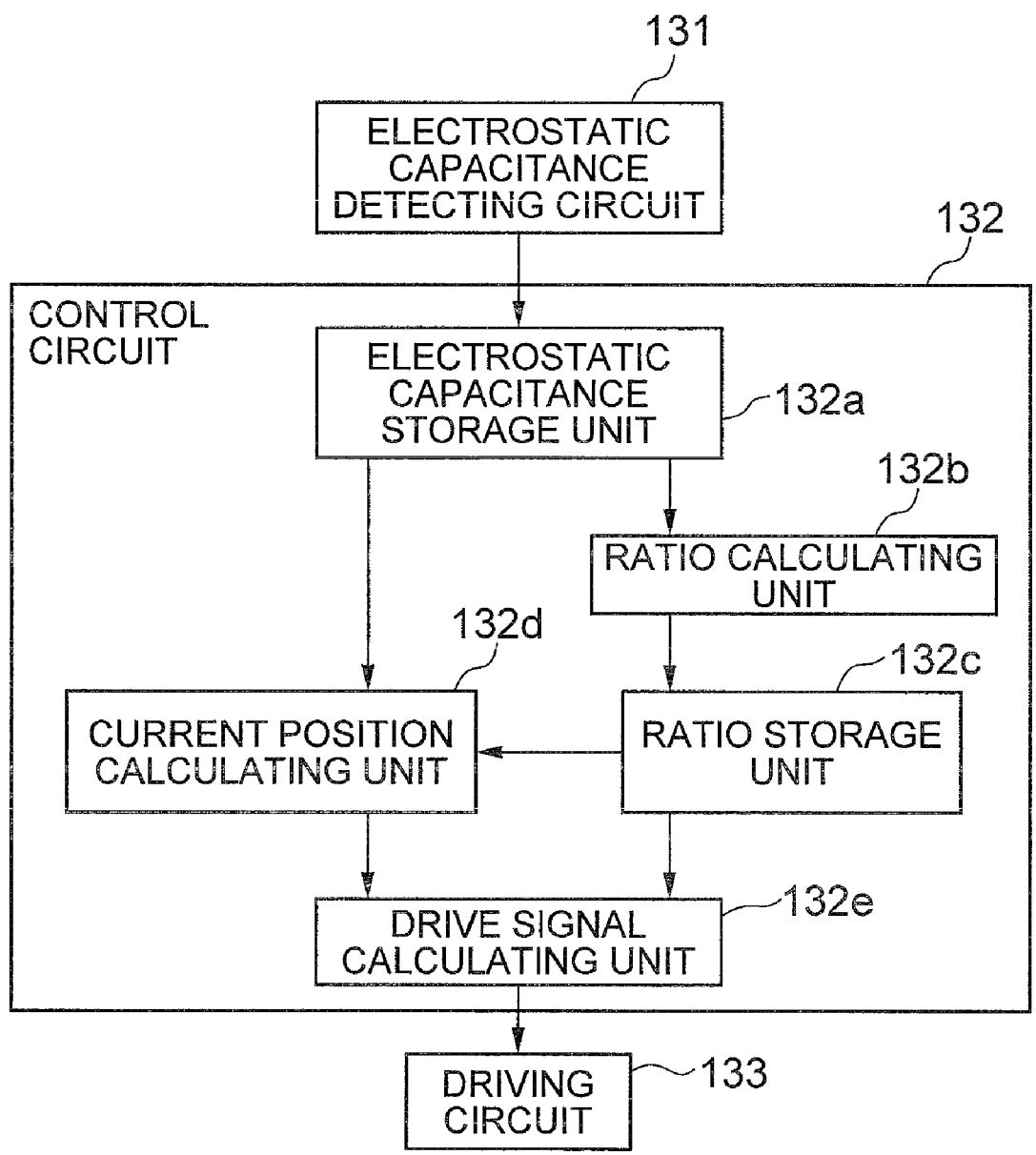
FIG. 3 is a block diagram of a control circuit according to the first embodiment of the present invention.

An outline of the processes performed by the control circuit 132 is explained with reference to FIG. 3. FIG. 3 is a block diagram depicting the detailed structure of the control circuit 132. The control circuit 132 includes an electrostatic capacitance storage unit 132a, a ratio calculating unit 132b, a ratio storage unit 132c, a current position calculating unit 132d, and a drive signal calculating unit 132e.

To begin with, the electrostatic capacitances input as detection results from the electrostatic capacitance detecting circuit 131 into the control circuit 132 are stored into the electrostatic capacitance storage unit 132a. That is, the electrostatic capacitance between the moving body side electrode 122 of the moving body 121 and the and the oscillating electrode 111, and the electrostatic capacitance between the moving body side electrode 122 and the oscillating plate electrode 112 are stored in the electrostatic capacitance storage unit 132a. The ratio calculating unit 132b calculates a ratio of a movement distance and the electrostatic capacitance of the moving body 121 based on these detected electrostatic capacitances. The calculation result is stored in the ratio storage unit 132c.

The calculation result obtained at the ratio calculating unit 132b is output to the current position calculating unit 132d. The current position calculating unit 132d calculates an absolute position (current position) of the moving body 121 on the oscillating plate 103. Subsequently, the drive signal calculating unit 132e generates drive signals for driving the oscillating plate electrodes 111 and 112, and the piezoelectric element 102 based on the calculation result obtained by the ratio calculating unit 132b and a calculation result obtained by the current position calculating unit 132d.

The generated drive signals are output to the driving circuit 133. The driving circuit 133 drives each of the oscillating plate electrodes 111 and 112, the moving body side electrode 122, and the piezoelectric element 102 based on the drive signals input from the control circuit.

The projecting section 105 is formed on the upper surface at the end of the fixed member 101 on the side of the spring 104. The projecting section 105 is formed in such a way that it covers from above the spring 104 and the end of the insulation layer 115 on the side of the spring 104. On the other hand, the projecting section 106 is formed on the upper surface at the end of the fixed member 101 on the side of the piezoelectric element 102. The projecting section 106 is formed in such a way that it covers from above the piezoelectric element 102 and the end of the insulation layer 115 on the side of the piezoelectric element 102.

The projecting sections 105 and 106 limit or regulate the range of movement of the moving body 121. In other words, a position where the moving body 121 abuts against the projecting section 105 marks a first movement limit position of the moving body 121, and a position where the moving body 121 abuts against the projecting section 106 marks a second movement limit position of the moving body 121. The distance between the first movement limit position and the second movement limit position is the maximum distance for which the moving body 121 can move (movement limit distance).

Principles of Position Detection

A detection method for detecting the position of the moving body 121 is explained next. The position of the moving body 121 is detected by using the same components that are used for driving the inertial drive actuator 100. That is, the position of the moving body 121 is detected by using the moving body side electrode 122 provided on the moving body 121 and the oscillating plate electrodes 111 and 112 provided on the oscillating plate 103. Opposing portions of the moving body side electrode 122 and the oscillating plate electrodes 111 and 112 can be considered as capacitors.

The position of the moving body 121 relative to the oscillating plate 103 can be detected by comparing, or detecting, the difference between the electrostatic capacitance equivalent to an opposing surface area between the moving body side electrode 122 and the oscillating plate electrode 111, and comparing, or detecting, the difference between the electrostatic capacitance equivalent to an opposing surface area between the moving body side electrode 122 and the oscillating plate electrode 112.

For example, when the moving body 121 is moved toward the left on the paper surface in FIG. 1 or 2, the opposing surface area between the moving body side electrode 122 and the oscillating plate electrode 111 increases, and hence the electrostatic capacitance between the oscillating plate electrode 111 and the moving body side electrode 122 increases. On the other hand, the opposing surface area between the moving body side electrode 122 and the oscillating plate electrode 112 decreases, and hence the electrostatic capacitance between the oscillating plate electrode 112 and the moving body side electrode 122 decreases. By determining the difference between the electrostatic capacitances, the position of the moving body 121 can be determined with a high degree of precision based on a magnitude relationship of the electrostatic capacitances.

The present embodiment is configured such that, as the moving body 121 moves from one movement limit position to the other movement limit position, the electrostatic capacitance between the moving body 121 and the oscillating plate electrode located near the other movement limit position increases. Furthermore, the position of the moving body and the electrostatic capacitances should preferably have a proportional relationship in the movement range from one movement limit position to the other movement limit position.

A position defined by either of the projecting sections 105 and 106 can be set as the first movement limit position. Moreover, the position of the moving body and the electrostatic capacitances need not have a proportional relationship as far as the electrostatic capacitance varies as the position of the moving body shifts.

In the above-described structure, when a driving voltage is applied to each of the oscillating plate electrodes 111 and 112, and the piezoelectric element 102, the oscillating plate 103 is displaced in the direction of displacement of the piezoelectric element 102. The displacement of the oscillating plate 103 enables the moving body 121 disposed on the oscillating plate 103 to move by inertia in the movement range from the first movement limit position to the second movement limit position defined by the projecting sections 105 and 106. Thus, it is possible to detect the position of the moving body 121 relative to the oscillating plate 103.

A driving principle of the inertial drive actuator 100 is explained more specifically by taking an exemplary case in which the moving body 121 moves toward the right (toward the projecting section 106).

When a steeply rising voltage is applied to the piezoelectric element 102 by the driving circuit 133, the piezoelectric element 102 rapidly expands and is displaced toward the left (toward the spring 104). With the displacement of the piezoelectric element 102 toward the left, the oscillating plate 103 too is rapidly displaced toward the left.

If the voltages of the oscillating plate electrodes 111 and 112, which are formed on the oscillating plate 103, and the voltage of the moving body side electrode 122 of the moving body 121 are maintained at the same potential, no electrostatic attraction is produced between the oscillating plate electrodes 111 and 112, and the moving body side electrode 122. Consequently, the moving body 121 remains stationary at its current position due to its inertia.

Subsequently, when there is a steep fall in the voltage applied to the piezoelectric element 102, the piezoelectric element 102 rapidly contracts. In this case, because of the elastic force of the spring 104 that presses against the piezoelectric element 102 and the oscillating plate 103, the piezoelectric element 102 is rapidly displaced toward the right. With the displacement of the piezoelectric element 102 toward the right, the oscillating plate 103 too is rapidly displaced toward the right. If electrostatic attraction is produced by creating a potential difference between the oscillating plate electrodes 111 and 112 of the oscillating plate 103, and the moving body side electrode 122 of the moving body 121, frictional forces between the moving body side electrode 122 and the oscillating plate electrodes 111 and 112 increase. Accordingly, the moving body 121 is also displaced toward the right with the displacement of the oscillating plate 103 toward the right.

The moving body 121 can be moved further toward the right in relation to the oscillating plate 103 by repeating the above-explained operation.

A calibration method for the inertial drive actuator 100 is explained next with reference to FIGS. 4 to 9.

Figure 4:
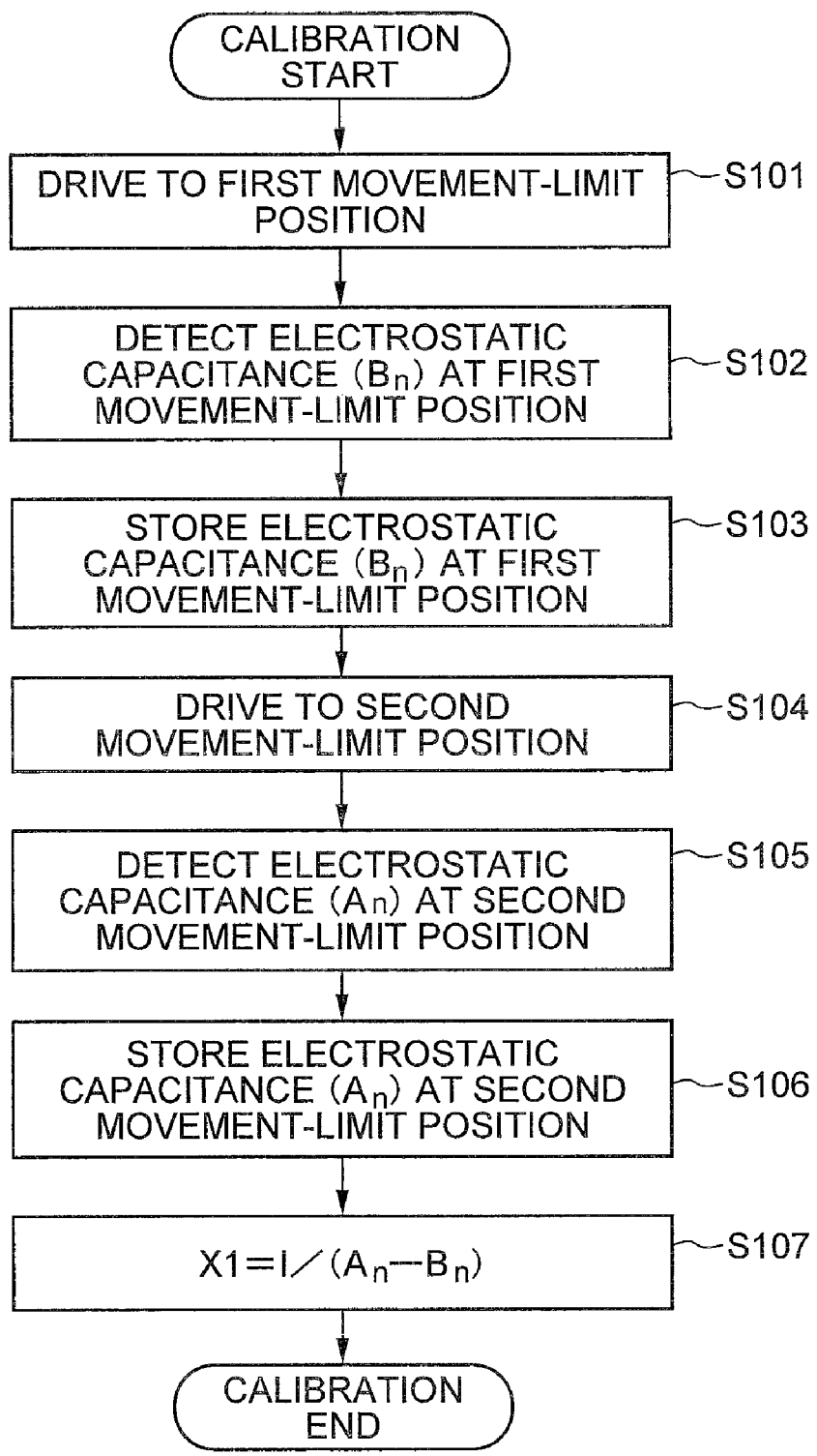
FIG. 4 is a flowchart of an outline of a calibration method for the inertial drive actuator according to the first embodiment of the present invention.

An outline of the calibration method is explained with reference to FIG. 4. FIG. 4 is a flowchart of the outline of the calibration method for the inertial drive actuator 100 according to the first embodiment of the present invention. In the following explanation, it is assumed that the first movement limit position is a position where the moving body 121 abuts against the projecting section 105 of the inertial drive actuator 100, and the second movement limit position is a position where the moving body 121 abuts against the projecting section 106 of the inertial drive actuator 100. In addition, it is assumed that the electrostatic capacitances between the moving body side electrode 122 of the moving body 121 and each of the oscillating plate electrodes 111 and 112 increase as the moving body 121 moves from the side of the projecting section 105 toward the side of the projecting section 106.

After the calibration starts, a voltage is applied to each of the oscillating plate electrodes 111 and 112, the moving body side electrode 122, and the piezoelectric element 102 so as to move the moving body 121 to the first movement limit position (Step S101).

An electrostatic capacitance Bn at the first movement limit position is detected (electrostatic capacitance detection step, Step S102). The detected electrostatic capacitance Bn is stored in the electrostatic capacitance storage unit 132a (electrostatic capacitance storage step, Step S103).

Subsequently, a voltage is applied to each of the oscillating plate electrodes 111 and 112, the moving body side electrode 122, and the piezoelectric element 102 so as to move the moving body 121 to the second movement limit position (Step S104). An electrostatic capacitance An at the second movement limit position is detected (electrostatic capacitance detection step, Step S105). The detected electrostatic capacitance An is stored in the electrostatic capacitance storage unit 132a (electrostatic capacitance storage step, Step S106).

The electrostatic capacitances An and En, which have been stored in the electrostatic capacitance storage unit 132a, are substituted in Equation (I) given below to calculate a ratio X1 of a difference between the electrostatic capacitance at each of the first movement limit position and the second movement limit position to a movement limit distance l that is a distance between the first movement limit position and the second movement limit position (ratio calculation step, Step S107).

$$X1 = l/(An - Bn) \quad (I)$$

In Equation (I), X1 is a ratio of the current electrostatic capacitance (that is, electrostatic capacitances when the calibration is being performed) to the movement limit distance (l) set at the time of assembly. The calculated ratio X1 is stored in the ratio storage unit 132c, after which the calibration ends. The distance l can be set at the time of assembly of the inertial drive actuator 100 or can be regulated by the projecting sections 105 and 106.

By using the ratio X1 calculated at the ratio calculation step as described above, the absolute position (current position) of the moving body 121 between the first movement limit position and the second movement limit position can be calculated by using Equation (II) given below:

$$\text{absolute position} = \text{electrostatic capacitance at the current position of the moving body 121} \times X1 \quad (II)$$

Figure 5:
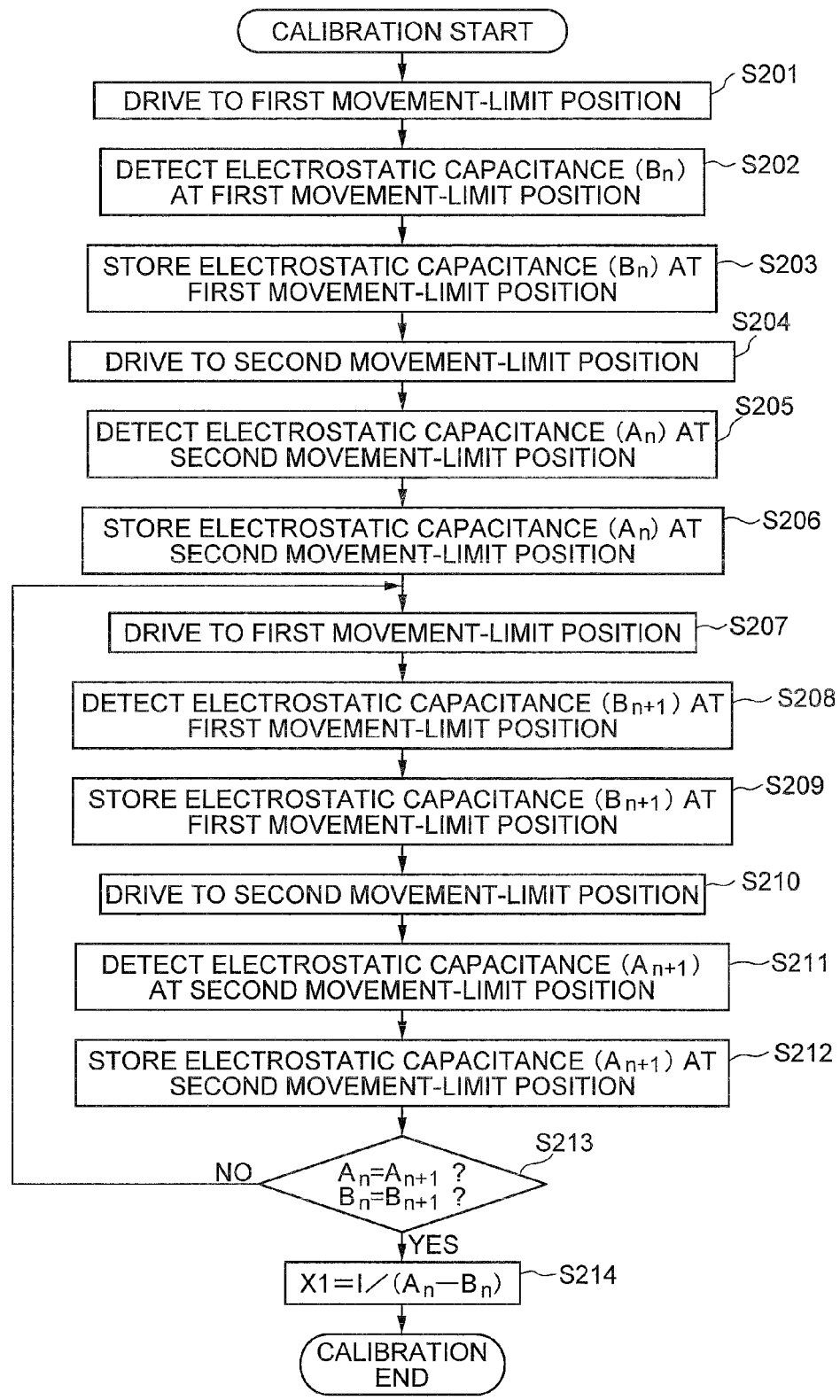
FIG. 5 is a flowchart of a calibration method for the inertial drive actuator according the first embodiment of the present invention.

The calibration method is explained next in greater detail with reference to FIG. 5. FIG. 5 is a flowchart of the calibration method of the inertial drive actuator 100 according to the first embodiment of the present invention. The first movement limit position and the second movement limit position are identical to the case explained with reference to FIG. 4. The electrostatic capacitances between the moving body side electrode 122 of the moving body 121 and the oscillating plate electrodes 111 and 112 are also identical to the case explained with reference to FIG. 4. Steps S201 to S206 in FIG. 5 are identical to Steps S101 to S106, respectively, in FIG. 4, and hence the explanation thereof is omitted.

After the electrostatic capacitance Bn at the first movement limit position and the electrostatic capacitance An at the second movement limit position are stored in the electrostatic capacitance storage unit 132a (Steps S203 and S206, respectively), confirmation steps (Steps S207 to S213) are performed. After completion of the confirmation steps, a ratio calculation step (Step S214) identical to Step S107 shown in FIG. 4 is performed.

In the confirmation steps, an electrostatic capacitance (Bn+1) at the first movement limit position and an electrostatic capacitance (An+1) at the second movement limit position are measured once again to enhance the reliability of the detection of electrostatic capacitance.

Specifically, a voltage is applied to each of the oscillating plate electrodes 111 and 112, the moving body side electrode 122, and the piezoelectric element 102 so as to move the moving body 121 to the first movement limit position (Step S207). The electrostatic capacitance Bn+1 at the first movement limit position is detected (electrostatic capacitance detection step, Step S208). The detected electrostatic capacitance Bn+1 is stored in the electrostatic capacitance storage unit 132a (electrostatic capacitance storage step, Step S209).

Subsequently, a voltage is applied to each of the oscillating plate electrodes 111 and 112, the moving body side electrode 122, and the piezoelectric element 102 so as to move the moving body 121 to the second movement limit position (Step S210). The electrostatic capacitance An+1 at the second movement limit position is detected (electrostatic capacitance detection step, Step S211). The detected electrostatic capacitance An+1 is stored in the electrostatic capacitance storage unit 132a (electrostatic capacitance storage step, Step S212).

The electrostatic capacitances An and An+1 as well as Bn and Bn+1 are compared, respectively (electrostatic capacitance comparison step, Step S213). Specifically, it is determined whether conditions An=An+1 and Bn=Bn+1 are satisfied. If both of these conditions are satisfied, the ratio calculation step (Step S214) is executed. In a situation where either or both of the conditions are not satisfied, the confirmation steps are repeated until the conditions are satisfied.

Figure 6:
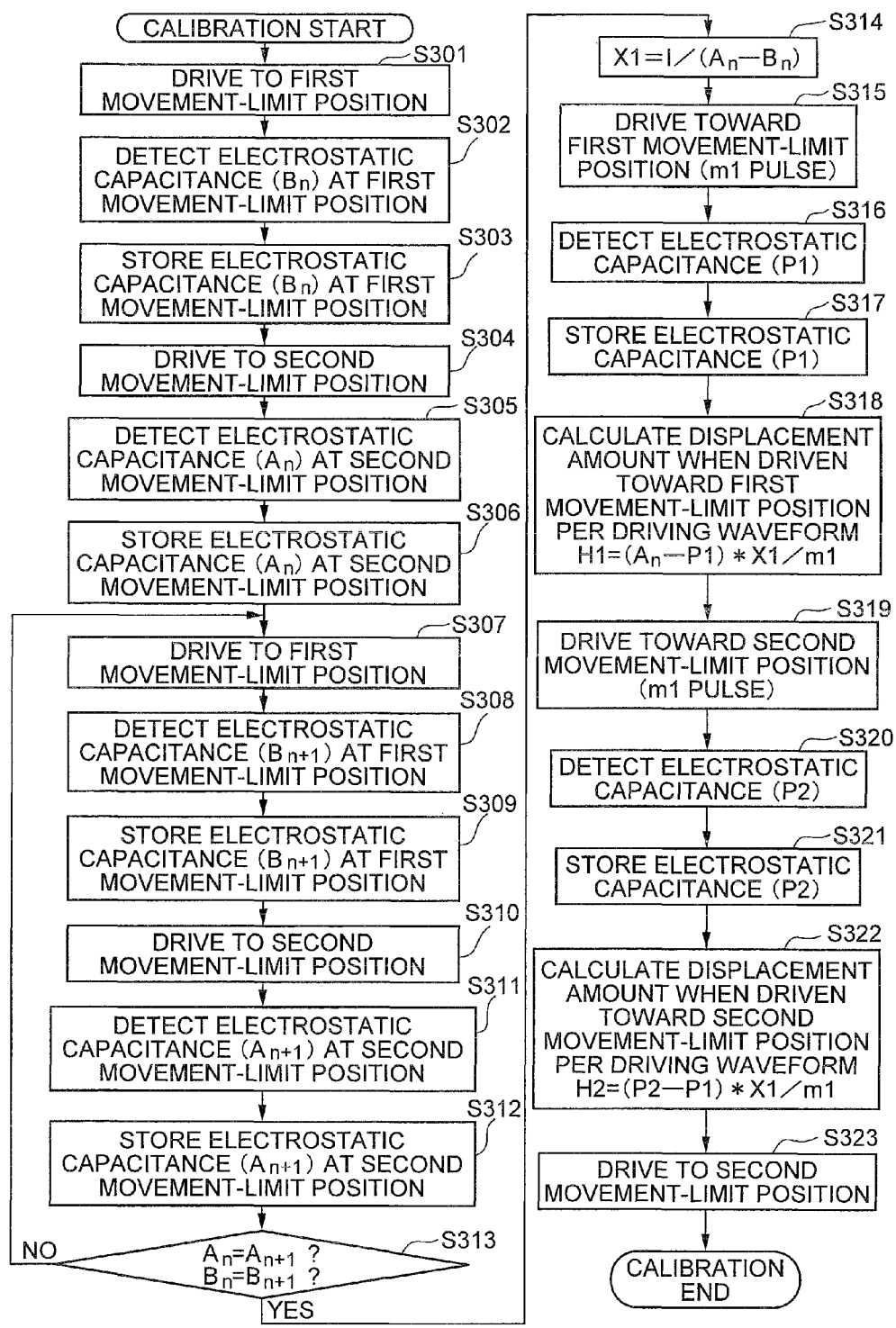
FIG. 6 is a flowchart of a first modification of the calibration method according to the first embodiment of the present invention.

The calibration method is explained next in even greater detail with reference to FIG. 6. FIG. 6 is a flowchart of a first modification of the calibration method according to the first embodiment of the present invention. The first movement limit position and the second movement limit position are identical to the case explained with reference to FIG. 4. The electrostatic capacitances between the moving body side electrode 122 of the moving body 121 and the oscillating plate electrodes 111 and 112 are also identical to the case explained with reference to FIG. 4. Steps S301 to S314 in FIG. 6 are identical to Steps S201 to S214, respectively, in FIG. 5, and hence the explanation thereof is omitted.

In the calibration method shown in FIG. 6, after the ratio calculation step (Step S314), movement amounts per driving waveform are calculated (Steps S315 to S322).

In calculating the movement amounts per driving waveform, a voltage is applied to each of the oscillating plate electrodes 111 and 112, the moving body side electrode 122, and the piezoelectric element 102 so as to move the moving body 121 toward the first movement limit position (Step S315). It is assumed that this movement is achieved by applying the number of driving waveforms represented by a driving waveform count m1 to the piezoelectric element 102. An electrostatic capacitance P1 is detected at the position where the movement of the moving body 121 stops (Step S316). The detected electrostatic capacitance P1 is stored in the electrostatic capacitance storage unit 132a (Step S317).

A displacement amount H1 per driving waveform when the moving body 121 is moved toward the first movement limit position is calculated from the electrostatic capacitances An and P1, the driving waveform count m1, and the ratio X1 stored in the electrostatic capacitance storage unit 132a (Step S318). Equation (III) given below is used for this calculation:

$$H1=(An-P1)\times X1/m1 \quad (III)$$

The calculated displacement amount H1 is stored in the ratio storage unit 132c, or a central processing unit (CPU).

Subsequently, a voltage is applied to each of the oscillating plate electrodes 111 and 112, the moving body side electrode 122, and the piezoelectric element 102 so as to move the moving body 121 toward the second movement limit position (Step S319). It is assumed that this movement too is achieved by applying the number of driving waveforms represented by a driving waveform count m1 to the piezoelectric element 102. An electrostatic capacitance P2 is detected at the position where the movement of the moving body 121 stops (Step S320). The detected electrostatic capacitance P2 is stored in the electrostatic capacitance storage unit 132a (Step S321).

A displacement amount H2 per driving waveform when the moving body 121 is moved toward the second movement limit is calculated from the electrostatic capacitances P1 and P2, the driving waveform count m1, and the ratio X1 stored in the electrostatic capacitance storage unit 132a (Step S322). Equation (IV) given below is used for this calculation:

$$H2=(P2-P1)\times X/m1 \quad (IV)$$

The calculated displacement amount H2 is stored in the ratio storage unit 132c, or the CPU.

After completion of the calculation of the displacement amounts per driving waveform H1 and H2, the moving body 121 is moved to the second movement limit position (Step S323).

Figure 7:
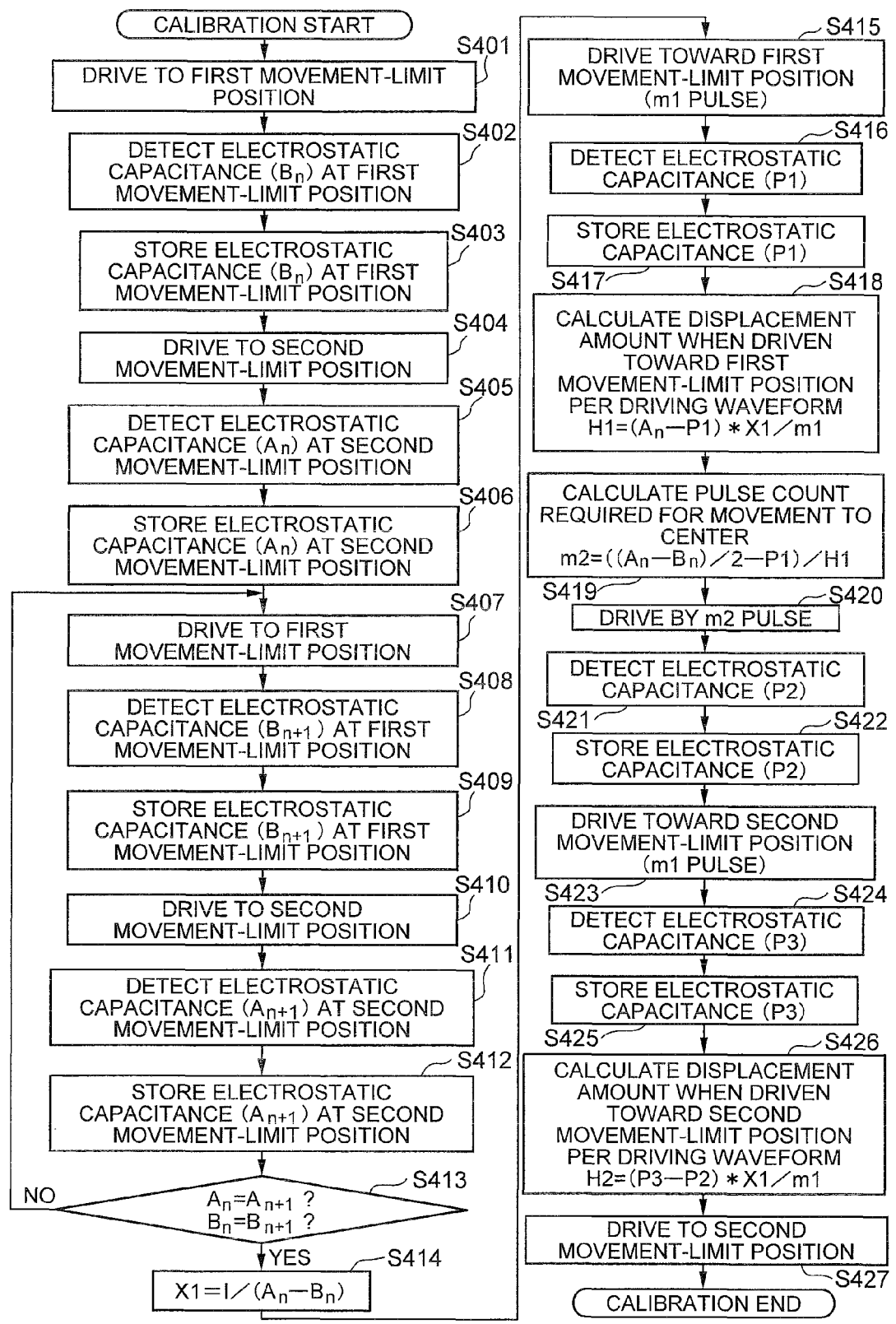
FIG. 7 is a flowchart of a second modification of the calibration method according to the first embodiment of the present invention.

The calibration method is explained below in even greater detail with reference to FIG. 7. FIG. 7 is a flowchart of a second modification of the calibration method according to the first embodiment of the present invention. The first movement limit position and the second movement limit position are identical to the case explained with reference to FIG. 4. The electrostatic capacitances between the moving body side electrode 122 of the moving body 121 and the oscillating plate electrodes 111 and 112 are also identical to the case explained with reference to FIG. 4. Steps S401 to S418 in FIG. 7 are identical to Steps S301 to S318, respectively, in FIG. 6, and hence the explanation thereof is omitted.

In the calibration method shown in FIG. 7, after the displacement amount H1 per driving waveform when the moving body 121 is moved toward the first movement limit position is calculated, a driving waveform count required for moving the moving body 121 to the center is calculated (Step S419). An electrostatic capacitance at the center is detected after moving the moving body 121 to the center. Subsequently, a displacement amount H2 per driving waveform when the moving body 121 is moved toward the second movement limit position is calculated (Steps S420 to S426). These steps are explained in detail below.

Equation (V) given below is used for calculating a driving waveform count m2 that indicates the number of waveforms required for moving the moving body 121 to the center:

$$m2=((An-Bn)/2-P1)/H1 \quad (V)$$

The "center" refers to a position that is midway between the first movement limit position and the second movement limit position measured at the time of assembly of the inertial drive actuator 100.

The calculated driving waveform count m2 is stored in the electrostatic capacitance storage unit 132a.

A configuration is allowable in which the driving waveform count m2 represents the number of waveforms required for moving the moving body 121 toward the center instead of the number of waveforms required for moving the moving body 121 to the center. When calculating the movement amount per driving waveform when the moving body 121 is moved toward the second movement limit position, if the driving waveform count is taken as m1, the moving body 121 will abut against the projecting section 106, resulting in incorrect calculation of movement amount per driving waveform. For this reason, the driving waveform count m2 is calculated to determine the movement amount for moving the moving body 121 once to the center.

The inertial drive actuator tends to be affected by gravity depending on its direction of installation. The effect of gravity is particularly significant if the actuator is installed in a vertical orientation. Due to the effect of gravity, the displacement amounts per waveform when the moving body 121 is moved toward the first movement limit position and when moved toward the second movement limit position differ. To take care of this issue, movement to and the Center is Carried out, and the displacement amounts per driving waveform when the moving body 121 is moved toward the first movement limit position and when moved toward the second movement limit position are calculated, and stored.

In the movement range from the first movement limit position to the second movement limit position, a proportional relationship exists between the distance from either movement limit position and the electrostatic capacitance. Therefore, the electrostatic capacitance at the center would be a value midway between the electrostatic capacitances An and Bn.

Why the term "toward the center" has been used here is explained below. At Step S419, the movement amount per driving waveform when the moving body 121 is moved toward the first movement limit position is already calculated but the movement amount per driving waveform when the moving body 121 is moved toward the second movement limit position is not yet calculated. Therefore, when the moving body 121 is at a position off the center toward the first movement limit position, it is first moved toward the second movement limit position, and in moving the moving body 121 toward the second movement limit position, the movement amount per driving waveform when the moving body 121 is moved toward the first movement limit position (displacement amount H1) is used.

The moving body 121 is moved to the center by driving the piezoelectric element 102 with the driving waveform count m2 that is calculated by using Equation (V) (Step S420), and the electrostatic capacitance P2 is detected at the center (Step S421). The detected electrostatic capacitance P2 is stored in the electrostatic capacitance storage unit 132a (Step S422).

Subsequently, a voltage is applied to each of the oscillating plate electrodes 111 and 112, the moving body side electrode 122, and the piezoelectric element 102 so as to move the moving body 121 toward the second movement limit position (Step S423). It is assumed that this movement is achieved by applying the number of driving waveforms represented by a driving waveform count m1 to the piezoelectric element 102. An electrostatic capacitance P3 is detected at the position where the movement of the moving body 121 stops (Step S424). The detected electrostatic capacitance P3 is stored in the electrostatic capacitance storage unit 132a (Step S425).

The displacement amount H2 per driving waveform when the moving body 121 is moved toward the second movement limit position is calculated from the electrostatic capacitances P2 and P3, the driving waveform count m1, and the ratio X1 stored in the electrostatic capacitance storage unit 132a (Step S426). Equation (VI) given below is used for the calculation:

$$H2=(P3-P2)\times X1/m1 \quad (VI)$$

The calculated displacement amount H2 is stored in the ratio storage unit 132c.

After completion of calculation of the displacement amounts H1 and H2, the moving body 121 is moved to the second movement limit position (Step S427).

Figure 8:
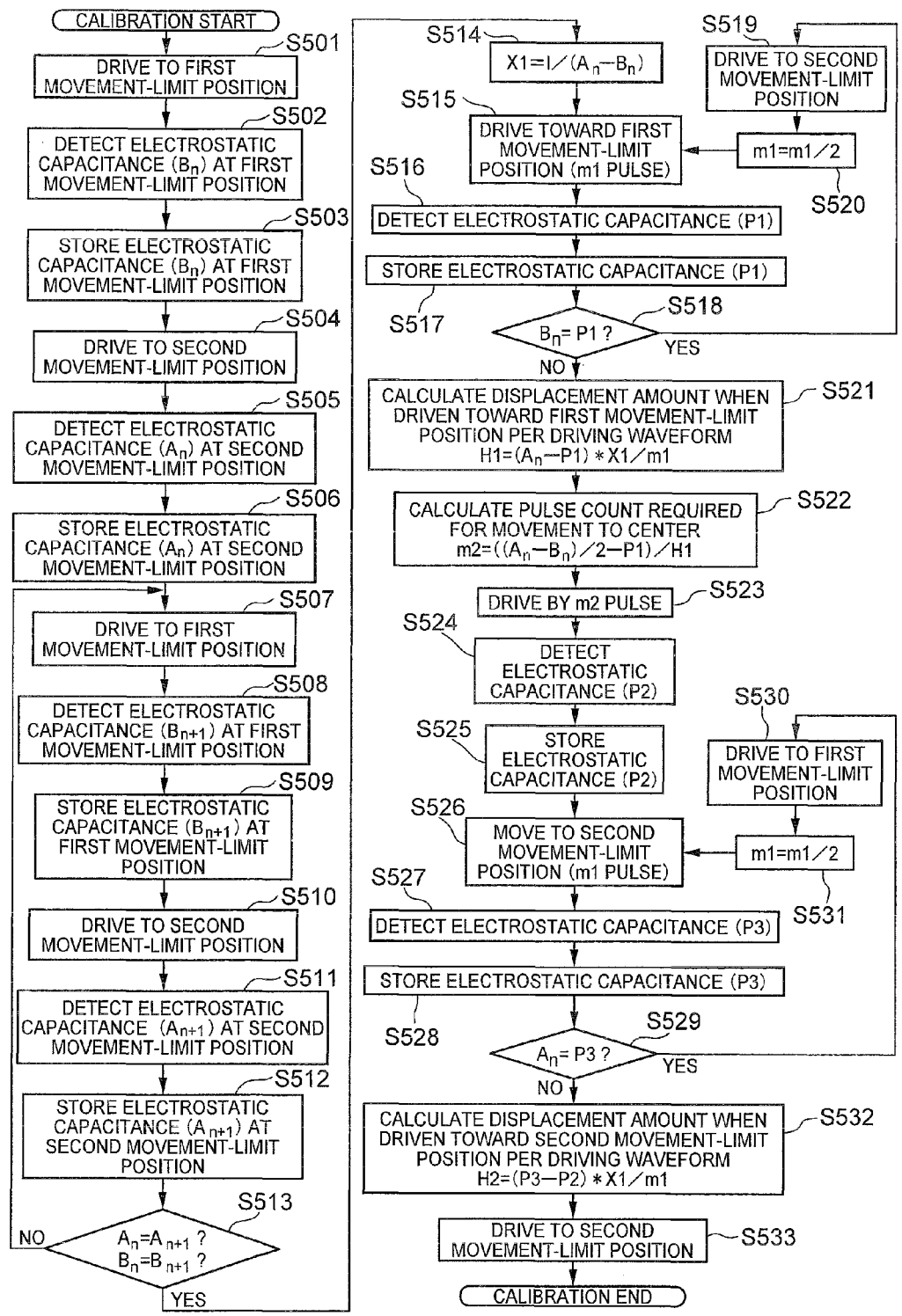
FIG. 8 is a flowchart of a third modification of the calibration method according to the first embodiment of the present invention.

The calibration method is explained in even greater detail with reference to FIG. 8. FIG. 8 is a flowchart of a third modification of the calibration method according to the first embodiment of the present invention. The first movement limit position and the second movement limit position are identical to the case explained with reference to FIG. 4. The electrostatic capacitances between the moving body side electrode 122 of the moving body 121 and the oscillating plate electrodes 111 and 112 are also identical to the case explained with reference to FIG. 4. Steps S501 to S517, Steps S521 to S528, Steps S532 and S533 in FIG. 8 are identical to Steps S401 to S417, Steps S418 to S425, and Steps S426 and S427, respectively, in FIG. 7, and hence the explanation thereof is omitted.

In the calibration method shown in FIG. 8, after the ratio calculation step (Step S514), the electrostatic capacitance P1 is detected after moving the moving body 121 toward the first movement limit position by m1 pulses, and the detected electrostatic capacitance P1 is stored (Steps S515 to S517). Subsequently, the detected electrostatic capacitance P1 and the electrostatic capacitance Bn at the first movement limit position are compared (comparison step, Step S518).

If the electrostatic capacitances Bn and P1 are identical (Yes at Step S518), it indicates that the moving body 121 has reached the projecting section 105 within the driving waveform count m1. The ratio X1 in this case cannot be correctly measured. Therefore, the moving body 121 is once again moved to the second movement limit position (Step S519), the driving waveform count m1 is halved (m1=m1/2) (Step S520), and the moving body 121 is driven toward the first movement limit position by applying a driving voltage equivalent to the halved driving waveform count m1 (Step S515). The electrostatic capacitance P1 is detected once again at the current position of the moving body 121, and the detected electrostatic capacitance P1 is stored (Steps S516 and S517).

The stored electrostatic capacitances P1 and Bn are compared (Step S518), and the steps of moving the moving body 121 to the second movement limit position (Step S519), halving of the driving waveform count m1 (m1=m1/2) (Step S520), driving the moving body 121 toward the first movement limit position (Step S515), and detecting and storing the electrostatic capacitance P1 (Steps S516 and S517) are repeated until the electrostatic capacitances P1 and Bn differ.

In a situation where the electrostatic capacitances P1 and Bn differ (No at Step S518), the displacement amount H1 per driving waveform when the moving body 121 is moved toward the first movement limit position is calculated from the electrostatic capacitances An and P1, the driving waveform count m1, and the ratio X1 (Step S521). Equation (III) is used for the calculation:

$$H1=(An-P1)\times X1/m1 \quad (III)$$

After completion of calculation of the displacement amount H1, similar to the calibration method shown in FIG. 7, the driving waveform count m2 required for moving the moving body 121 to the center is calculated (Step S522), the electrostatic capacitance P2 after the moving body 121 is driven by a voltage equivalent to the driving waveform count m2 is detected and stored (Steps S523 to S525), and the electrostatic capacitance P3 after the moving body 121 is driven by the voltage equivalent to the driving waveform count m1 toward the second movement limit position is detected and stored (Steps S526 to S528).

The detected electrostatic capacitance P3 and the electrostatic capacitance An at the second movement limit position are compared (comparison step, Step S529).

If the electrostatic capacitances An and P3 are identical (Yes at Step S529), it indicates that the moving body 121 has reached the projecting section 106 within the driving waveform count m1. The ratio X1 in this case cannot be correctly measured. Therefore, the moving body 121 is once again moved to the first Movement limit position (Step S530), the driving waveform count m1 is halved (m1=m1/2) (Step S531), and the moving body 121 is driven toward the second movement limit position by applying a driving voltage equivalent to the halved driving waveform count m1 (Step S526). The electrostatic capacitance P3 is detected once again at the current position of the moving body 121, and the detected electrostatic capacitance P3 is stored (Steps S527 and S528).

Subsequently, the stored electrostatic capacitances P3 and An are compared (Step S529), and the steps of moving the moving body 121 to the first movement limit position (Step S530), halving of the driving waveform count m1 (m1=m1/2) (Step S531), driving the moving body 121 toward the second movement limit position (Step S526), and detecting and storing the electrostatic capacitance P1 (Steps S527 and S528) are repeated until the electrostatic capacitances P3 and An differ.

In a situation where the electrostatic capacitances An and P3 differ (No at Step S529), the displacement amount H2 per driving waveform when the moving body 121 is moved toward the second movement limit position is calculated from the electrostatic capacitances P2 and P3, the driving waveform count m1, and the ratio X1 (Step S532). Equation (VII) is used for the calculation:

$$H2=(P3-P2)\times X1/m1 \tag{VII}$$

After completion of calculation of the displacement amounts H1 and H2, the moving body 121 is moved to the second movement limit position (Step S533).

Figure 9:
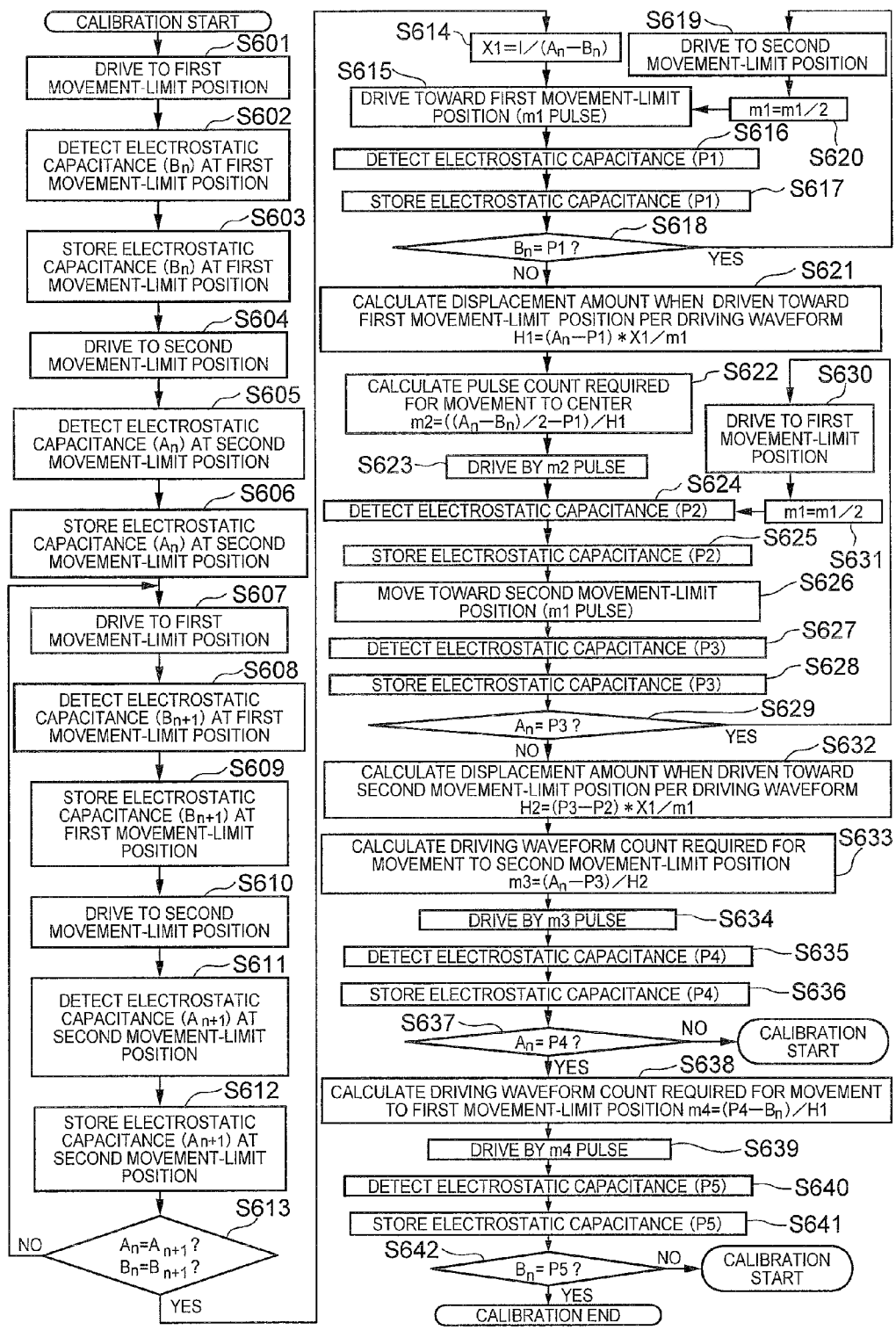
FIG. 9 is a flowchart of a fourth modification of the calibration method according to the first embodiment of the present invention.

The calibration method is explained in even greater detail with reference to FIG. 9. FIG. 9 is a flowchart of a fourth modification of the calibration method according to the first embodiment of the present invention. The first movement limit position and the second movement limit position are identical to the case explained with reference to FIG. 4. The electrostatic capacitances between the moving body side electrode 122 of the moving body 121 and the oscillating plate electrodes 111 and 112 are also identical to the case explained with reference to FIG. 4. Steps S601 to S632 in FIG. 9 are identical to Steps S501 to S532, respectively, in FIG. 8, and hence the explanation thereof is omitted.

In the calibration method shown in FIG. 9, the electrostatic capacitance P3 when the moving body 121 is moved toward the second movement limit position (Step S627) and the electrostatic capacitance An at the second movement limit position (Step S605) are compared. If the electrostatic capacitances P3 and An differ (No at Step S629), the displacement amount H2 per driving waveform when the moving body 121 is moved toward the second movement limit position is calculated from the electrostatic capacitances P2 and P3, the driving waveform count m1, and the ratio X1 (Step S632). Equation (VII) is used for the calculation:

$$H2=(P3-P2)\times X1/m1 \tag{VII}$$

A driving waveform count m3 required for moving the moving body 121 to the second movement limit position is calculated by using Equation (VIII) given below, from the electrostatic capacitances An and P3, and the displacement amount H2 per driving waveform (Step S633):

$$m3=(An-P3)/H2 \tag{VIII}$$

Subsequently, a voltage is applied to each of the oscillating plate electrodes 111 and 112, the moving body side electrode 122, and the piezoelectric element 102 so as to move the moving body 121 toward the second movement limit position (Step S634). It is assumed that this movement is achieved by applying the number of driving waveforms represented by a driving waveform count m3 to the piezoelectric element 102. An electrostatic capacitance P4 is detected at the position where the movement of the moving body 121 stops (Step S635). The detected electrostatic capacitance P4 is stored in the electrostatic capacitance storage unit 132a (Step S636).

The detected electrostatic capacitance P4 and the electrostatic capacitance An at the second movement limit position are compared (comparison step, Step S637). If the electrostatic capacitances P4 and An differ (No at Step S637), the calibration is performed once again from Step S601.

If the electrostatic capacitances P4 and An are identical (Yes at Step S637), a driving waveform count m4 required for moving the moving body 121 to the first movement limit position is calculated by using Equation (IX) given below, from the electrostatic capacitances Bn and P4, and the displacement amount H1 per driving waveform (Step S638):

$$m4=(P4-Bn)/H1 \tag{IX}$$

Subsequently, a voltage is applied to each of the oscillating plate electrodes 111 and 112, the moving body side electrode 122, and the piezoelectric element 102 so as to move the moving body 121 toward the first movement limit position (Step S639). It is assumed that this movement is achieved by applying the number of driving waveforms represented by a driving waveform count m4 to the piezoelectric element 102. An electrostatic capacitance P5 is detected at the position where the movement of the moving body 121 stops (Step S640). The detected electrostatic capacitance P5 is stored in the electrostatic capacitance storage unit 132a (Step S641).

The detected electrostatic capacitance P5 and the electrostatic capacitance Bn at the first movement limit position are compared (comparison step, Step S642). If the electrostatic capacitances P5 and Bn differ (No at Step S642), the calibration is performed again from Step S601. If the electrostatic capacitances P5 and Bn are identical (Yes at Step S642), the calibration is terminated.

In the calibration method shown in FIG. 9, recalibration can be induced, that is, calibration is performed once again, when the electrostatic capacitance varies and an error is detected in the relationship between position data and the electrostatic capacitance even if the moving body 121 is idle in absence of an input signal (Steps S637 and S642).

The electrostatic capacitance generally varies due to a change in the environment conditions such as humidity, temperature, and gravity, and can be expressed by using Equation (X) given below:

$$C=\epsilon 0\epsilon s\cdot S/d \tag{X}$$

where C is electrostatic capacitance, $\epsilon 0$ is vacuum permittivity, $\epsilon s$ is specific permittivity of the insulation layer between the electrodes, S is electrode area, and d is electrode spacing.

For example, due to a variation in the humidity, when there is a variation in the specific permittivity $\epsilon s$ and an associated variation in moisture absorption by the electrodes, the electrode area S and the electrode spacing d also vary. Furthermore, due to a variation in the temperature, when there is a variation in the specific permittivity $\epsilon s$ of the insulation layer and an associated thermal expansion of structural components, the electrode area S and the electrode spacing d also vary. Moreover, the gravitational force acting on the moving body varies according to the orientation of the actuator, leading to a variation in the electrode spacing d.

The operating environment of the actuator can vary even when the actuator is in use, leading to variations in the electrostatic capacitances between the moving body side electrode and the oscillating plate electrodes. In the actuator device according to the first embodiment, to measure such a variation in the electrostatic capacitances, the electrostatic capacitances are detected and confirmed in a situation where the moving body 121 has been idle for a certain period. If there is a difference between the capacitances measured at the last operation and after the certain idle period, the operator is prompted to induce recalibration.

Though not limited to these, a blinking lamp or a display on a display device can be used as means by which the operator can be prompted to induce recalibration. Alternatively, recalibration can be automatically induced, as shown in FIG. 9.

(Second Embodiment)

Figure 10:
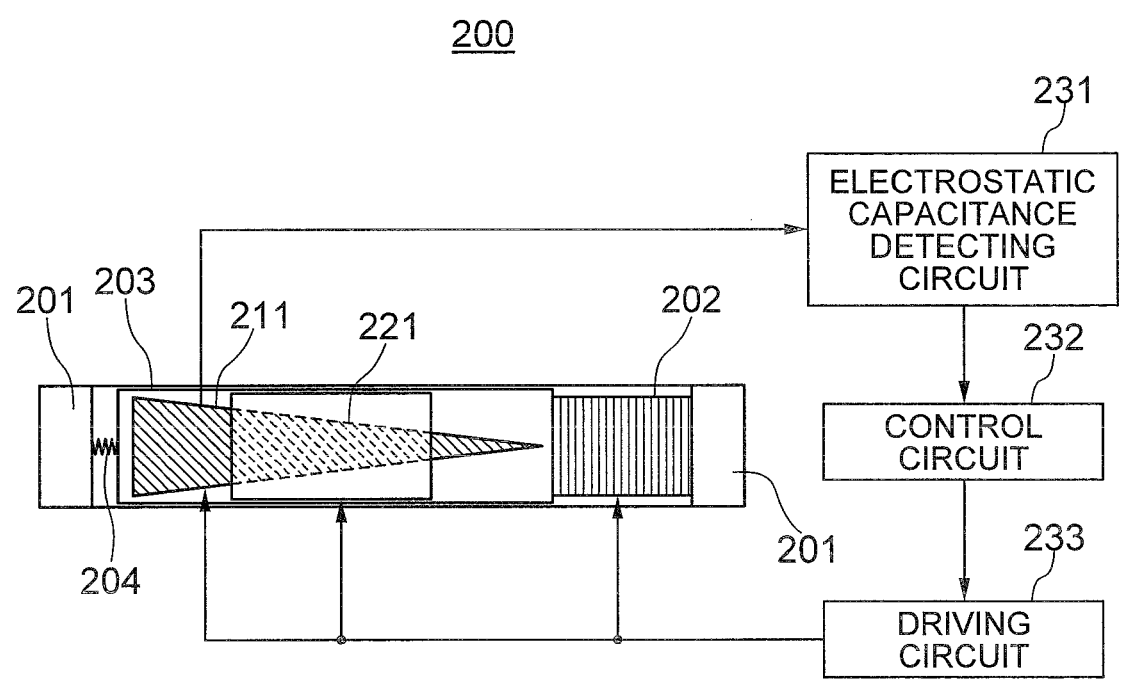
FIG. 10 is a plan-view depicting the structure of an inertial drive actuator device that includes an inertial drive actuator according to a second embodiment of the present invention.
Figure 11:
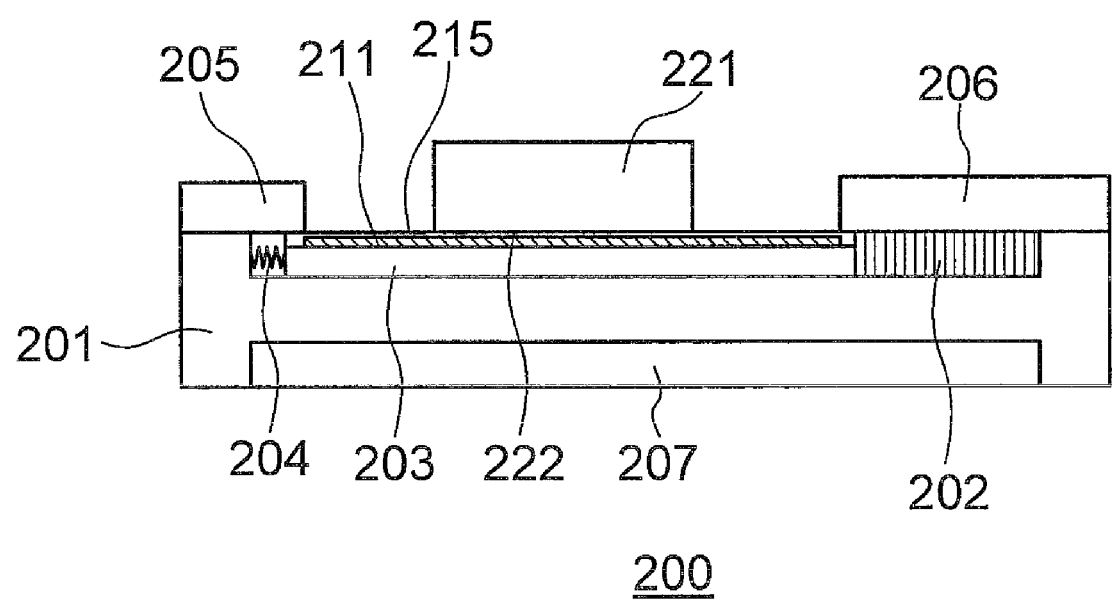
FIG. 11 is a side-view depicting the structure of the inertial drive actuator according to the second embodiment of the present invention.

The structure of an inertial drive actuator 200 according to a second embodiment is explained with reference to FIGS. 10 and 11. FIG. 10 is a plan-view depicting the structure of an inertial drive actuator device that includes the inertial drive actuator 200 according to the second embodiment of the present invention. FIG. 11 is a side-view depicting the structure of the inertial drive actuator 200. Attention is drawn to the fact that projecting sections 205 and 206 are not shown in FIG. 10.

The inertial drive actuator 200 according to the second embodiment differs from the inertial drive actuator 100 according to the first embodiment in that it includes only one oscillating plate electrode 211. Moreover, a width of the oscillating plate electrode 211 narrows as one goes from a spring 204 toward a piezoelectric element 202 in a longitudinal direction of an oscillating plate 203. The rest of the structure of the inertial drive actuator 200 is identical to that of the inertial drive actuator 100 according to the first embodiment.

Because of the change in the width of the oscillating plate electrode 211 in the longitudinal direction of the oscillating plate 203, as a moving body 221 moves from one movement limit position (the position where the moving body 221 abuts against the projecting section 206) to the other movement limit position (the position where the moving body 221 abuts against the projecting section 205), the electrostatic capacitance between a moving body side electrode 222 of the moving body 221 and the oscillating plate electrode 211 varies. Furthermore, as a planar shape of the oscillating plate electrode 211 is made into a triangular shape, there is a proportional relationship between the position of the moving body 221 and the electrostatic capacitance in the movement range from one movement limit position to the other movement limit position.

A fixed member 201, the piezoelectric element 202, the spring 204, the projecting sections 205 and 206, a permanent magnet 207, and the moving body 221 of the inertial drive actuator 200 are identical, respectively, to the fixed member 101, the piezoelectric element 102, the spring 104, the projecting sections 105 and 106, the permanent magnet 107, and the moving body 121 of the inertial drive actuator 100 according to the first embodiment, and hence the explanation thereof is omitted.

The oscillating plate electrode 211 is formed on the upper surface of the oscillating plate 203. Moreover, an insulation layer 215 is formed on the upper surface of the oscillating plate electrode 211. The moving body 221 is mounted on the oscillating plate electrode 211, with the insulation layer 215 disposed therebetween. A moving body side electrode 222 is formed on the lower surface of the moving body 221, that is, on the surface that is in contact with the oscillating plate electrode 211. With the displacement of the oscillating plate 203, the moving body 221 is capable of moving slidingly in relation to the insulation layer 215 in a longitudinal direction (right and left directions in FIGS. 10 and 11) of the oscillating plate 203 having a rectangular shape. The moving body 221 should preferably be made of a magnetic material or a conductive material.

A driving circuit 233 is connected to each of the piezoelectric element 202, the oscillating plate electrode 211, and the moving body side electrode 222 of the moving body 221. The driving circuit 233 applies a driving voltage to drive each of the piezoelectric element 202, the oscillating plate electrode 211, and the moving body side electrode 222. Furthermore, an electrostatic capacitance detecting circuit 231 is connected to the oscillating plate electrode 211. The electrostatic capacitance detecting circuit 231 detects an electrostatic capacitance between the moving body side electrode 222 of the moving body 221 and the oscillating plate electrode 211. Signals output from the electrostatic capacitance detecting circuit 231 are input into a control circuit 232.

The structure of the control circuit 232 is identical to the control circuit 132 of the inertial drive actuator 100, and hence the explanation thereof is omitted. The inertial drive actuator device according to the second embodiment includes the inertial drive actuator 200, the electrostatic capacitance detecting circuit 231 and the driving circuit 233 that are connected to the inertial drive actuator 200, and the control circuit 232.

By virtue of the above-described structure, a calibration identical to that of the inertial drive actuator 100 can be executed even in the inertial drive actuator 200, and consequently, even if the electrostatic capacitance between the moving body 221 and the oscillating plate electrode 211 differs at a later stage after the assembly of the actuator, it can be corrected to an appropriate value. As a result, the absolute position of the moving body 221 can be reliably and accurately calculated.

(Third Embodiment)

Figure 12:
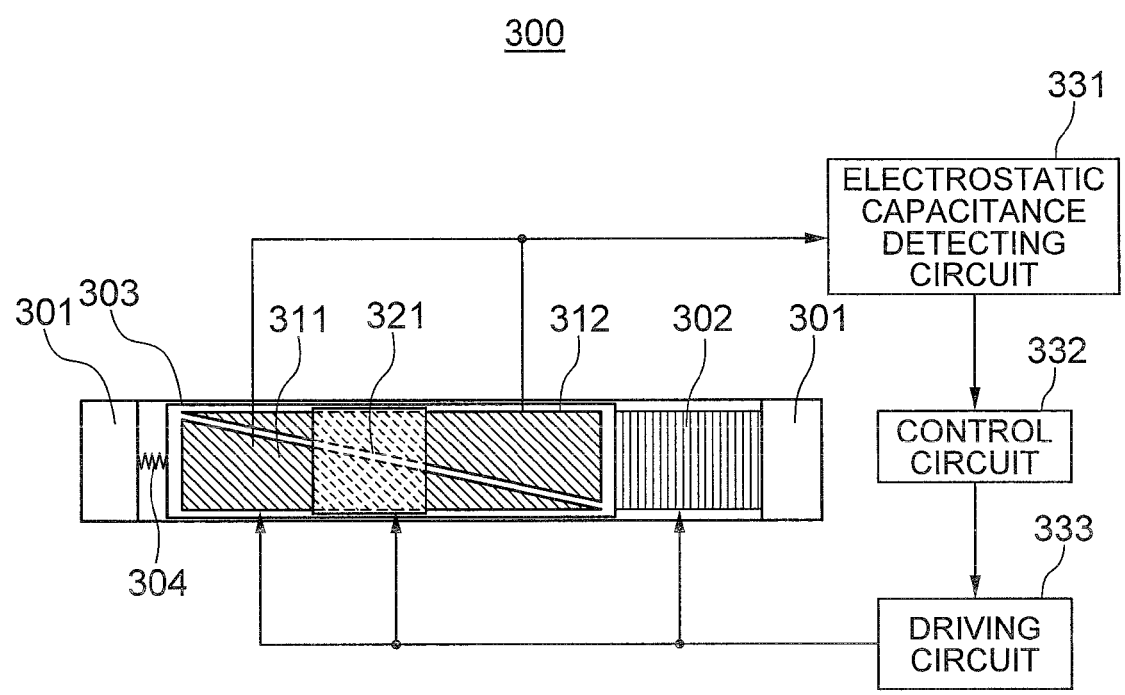
FIG. 12 is a plan-view depicting structure of an inertial drive actuator device that includes an inertial drive actuator according to a third embodiment of the present invention.
Figure 13:
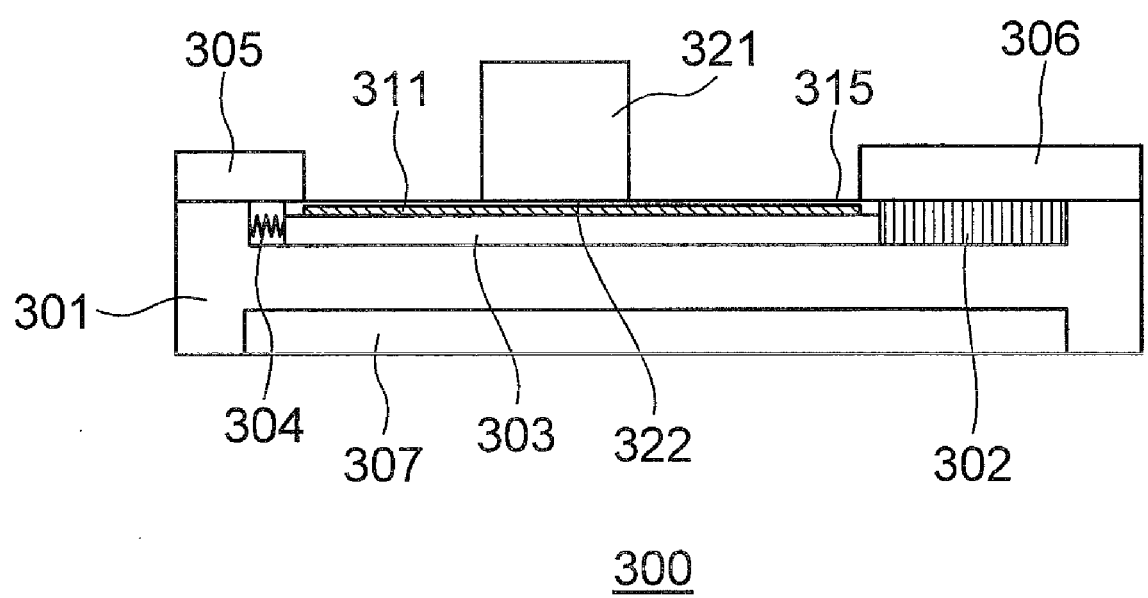
FIG. 13 is a side-view depicting the structure of the inertial drive actuator according to the third embodiment of the present invention.

The structure of an inertial drive actuator 300 according to a third embodiment is explained with reference to FIGS. 12 and 13. FIG. 12 is a plan-view depicting the structure of an inertial drive actuator device that includes the inertial drive actuator 300 according to the third embodiment of the present invention. FIG. 13 is a side-view depicting the structure of the inertial drive actuator 300. Attention is drawn to the fact that projecting sections 305 and 306 are not shown in FIG. 12.

The inertial drive actuator 300 according to the third embodiment differs from the inertial drive actuator 100 according to the first embodiment in that it includes two oscillating plate electrodes 311 and 312 of right-angled triangular shape and disposed in such a way that the oblique sides thereof are adjacent to each other. In other words, a width of the oscillating plate electrode 311 narrows as one goes from a spring 304 toward a piezoelectric element 302 in a longitudinal direction of an oscillating plate 303, and a width of the oscillating plate electrode 312 narrows as one goes from the piezoelectric element 302 to the spring 304 in the longitudinal direction of the oscillating plate 303. The rest of the structure of the inertial drive actuator 300 is identical to that of the inertial drive actuator 100 according to the first embodiment.

Because the oscillating plate electrodes 311 and 312 have the planer shape described above, the electrostatic capacitances between the oscillating plate electrodes 311 and 312, and a moving body side electrode 322 of a moving body 321 vary proportionally with the movement amount as the moving body 321 moves from one movement limit position to the other movement limit position.

A fixed member 301, the piezoelectric element 302, the spring 304, the projecting sections 305 and 306, a permanent magnet 307, and the moving body 321 of the inertial drive actuator 300 are identical, respectively, to the fixed member 101, the piezoelectric element 102, the spring 104, the projecting sections 105 and 106, the permanent magnet 107, and the moving body 121 of the inertial drive actuator 100 according to the first embodiment, and hence the explanation thereof is omitted.

The oscillating plate electrodes 311 and 312 are formed on the upper surface of the oscillating plate 303. Moreover, an insulation layer 315 is formed on the upper surface of the oscillating plate electrodes 311 and 312. The moving body 321 is mounted on the oscillating plate electrodes 311 and 312, with the insulation layer 315 disposed therebetween. A moving body side electrode 322 is formed on the lower surface of the moving body 321, that is, on the surface that is in contact with the oscillating plate electrodes 311 and 312.

With the displacement of the oscillating plate 303, the moving body 321 is capable of moving slidingly in relation to the insulation layer 315 in a longitudinal direction (right and left directions in FIGS. 12 and 13) of the oscillating plate 303 having a rectangular shape. The moving body 321 should preferably be made of a magnetic material or a conductive material.

A driving circuit 333 is connected to each of the piezoelectric element 302, the oscillating plate electrodes 311 and 312, and the moving body side electrode 322 of the moving body 321. The driving circuit 333 applies a driving voltage to drive each of the piezoelectric element 302, the oscillating plate electrodes 311 and 312, and the moving body side electrode 322. Furthermore, an electrostatic capacitance detecting circuit 331 is connected to each of the oscillating plate electrodes 311 and 312. The electrostatic capacitance detecting circuit 331 detects an electrostatic capacitance between the moving body side electrode 322 of the moving body 321 and each of the oscillating plate electrodes 311 and 312.

Signals output from the electrostatic capacitance detecting circuit 331 are input into the control circuit 332. The structure of the control circuit 332 is identical to that of the control circuit 132 of the inertial drive actuator 100, and hence the explanation thereof is omitted. The inertial drive actuator device includes the inertial drive actuator 300, the electrostatic capacitance detecting circuit 331 and the driving circuit 333 that are connected to the inertial drive actuator 300, and the control circuit 332.

The electrostatic capacitance detecting circuit 331 detects the electrostatic capacitance between the oscillating plate electrode 311 and the moving body side electrode 322 as well as the electrostatic capacitance between the oscillating plate electrode 312 and the moving body side electrode 322. These electrostatic capacitances vary as the moving body 321 moves from one movement limit position to the other movement limit position. The electrostatic capacitance between the moving body side electrode 322 and either of the oscillating plate electrodes 311 and 312 can be used for detecting the position of the moving body 321.

By virtue of the above-described structure, a calibration identical to that of the inertial drive actuator 100 can be executed even in the inertial drive actuator 300, and consequently, even if the electrostatic capacitances between the moving body 321 and the oscillating plate electrodes 311 and 312 differ at a later stage after the assembly of the actuator, they can be corrected to appropriate values. As a result, the absolute position of the moving body 321 can be reliably and accurately calculated.

(Fourth Embodiment)

Figure 14:
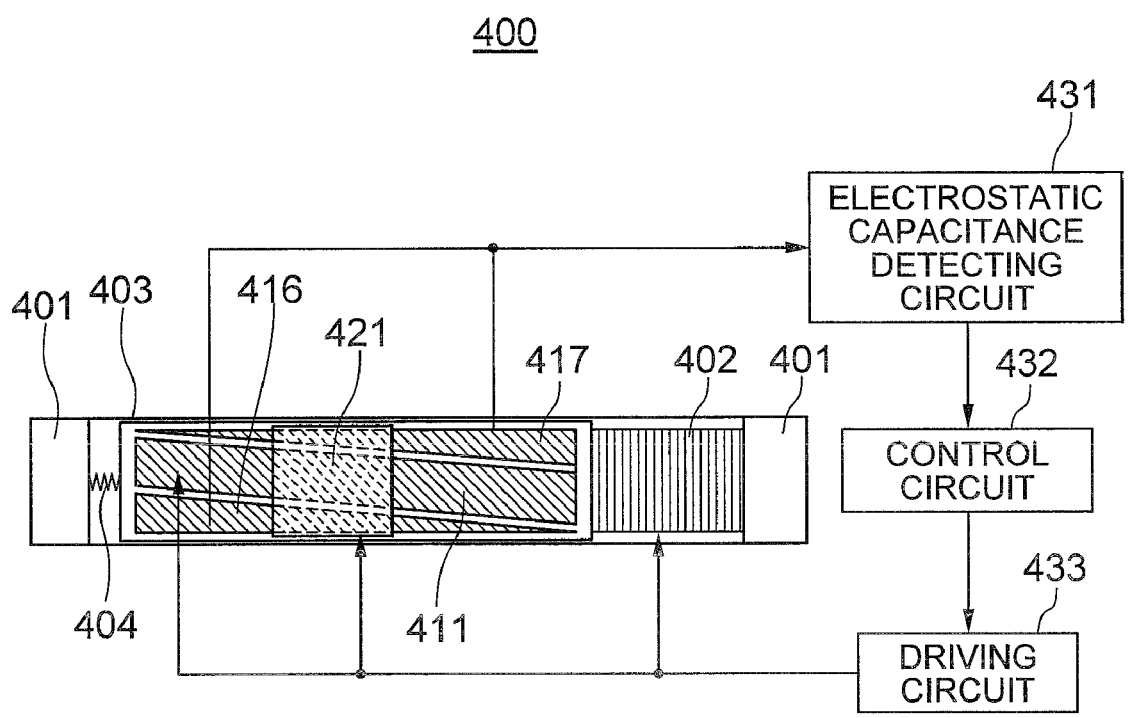
FIG. 14 is a plan-view depicting the structure of an inertial drive actuator device that includes an inertial drive actuator according to a fourth embodiment of the present invention.
Figure 15:
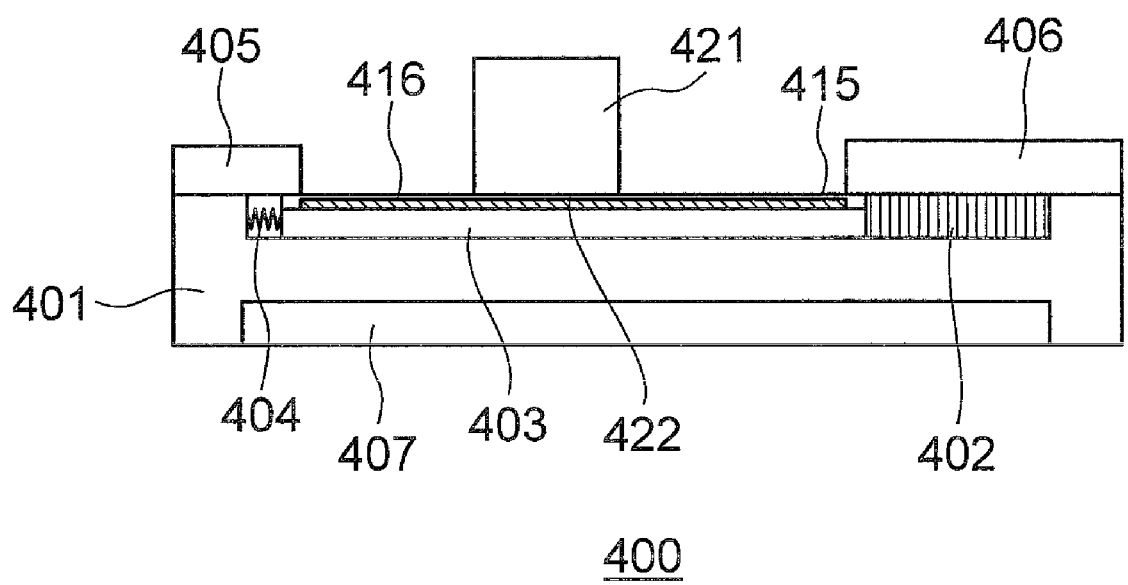
FIG. 15 is a side-view depicting the structure of the inertial drive actuator according to the fourth embodiment of the present invention.

The structure of an inertial drive actuator 400 according to a fourth embodiment is explained with reference to FIGS. 14 and 15. FIG. 14 is a plan-view depicting the structure of an inertial drive actuator device that includes the inertial drive actuator 400 according to the fourth embodiment of the present invention. FIG. 15 is a side-view depicting the structure of the inertial drive actuator 400. Attention is drawn to the fact that projecting sections 405 and 406 are not shown in FIG. 14.

The inertial drive actuator 400 according to the fourth embodiment differs from the inertial drive actuator 100 according to the first embodiment in that it includes an oscillating plate 403 on which are formed two oscillating plate position detecting electrodes 416 and 417, with an oscillating plate driving electrode 411 disposed therebetween, instead of the oscillating plate electrodes 111 and 112. The rest of the structure of the inertial drive actuator 400 is identical to that of the inertial drive actuator 100 according to the first embodiment.

Specifically, the oscillating plate position detecting electrodes 416 and 417 have a planar shape of right-angled triangles and are disposed in such a way that the oblique sides thereof are adjacent to each other. Furthermore, the oscillating plate driving electrode 411 has a planar shape of a parallelogram whose long sides are arranged adjacent to the oblique sides of the oscillating plate position detecting electrodes 416 and 417.

Because the oscillating plate position detecting electrodes 416 and 417 have the planer shape described above, the electrostatic capacitances between the oscillating plate position detecting electrodes 416 and 417, and a moving body side electrode 422 of a moving body 421 vary proportionally with the movement amount as the moving body 421 moves from one movement limit position to the other movement limit position.

A fixed member 401, a piezoelectric element 402, a spring 404, the projecting sections 405 and 406, a permanent magnet 407, and the moving body 421 of the inertial drive actuator 400 are identical, respectively, to the fixed member 101, the piezoelectric element 102, the spring 104, the projecting sections 105 and 106, the permanent magnet 107, and the moving body 121 of the inertial drive actuator 100 according to the first embodiment, and hence the explanation thereof is omitted.

The oscillating plate driving electrode 411, and the oscillating plate position detecting electrodes 416 and 417 are formed on the upper surface of the oscillating plate 403, and an insulation layer 415 is formed on the upper surface of the oscillating plate driving electrode 411. The moving body 421 is mounted on the oscillating plate driving electrode 411, and the oscillating plate position detecting electrodes 416 and 417 with the insulation layer 415 disposed therebetween. The moving body side electrode 422 is formed on the lower surface of the moving body 421, that is, on the surface that is in contact with the oscillating plate driving electrode 411, and the oscillating plate position detecting electrodes 416 and 417. With the displacement of the oscillating plate 403, the moving body 421 is capable of moving slidingly in relation to the insulation layer 415 in a longitudinal direction (left and right directions in FIGS. 14 and 15) of the oscillating plate 403 having a rectangular shape. The moving body 421 should preferably be made of a magnetic material or a conductive material.

A driving circuit 433 is connected to each of the piezoelectric element 402, the oscillating plate driving electrode 411, and the moving body side electrode 422 of the moving body 421, and applies the driving voltage to drive the piezoelectric element 402, the oscillating plate driving electrode 411, and the moving body side electrode 422. Furthermore, an electrostatic capacitance detecting circuit 431 is connected to each of the oscillating plate position detecting electrodes 416 and 417, and detects the electrostatic capacitance between the moving body side electrode 422 of the moving body 421 and the oscillating plate position detecting electrodes 416 and 417.

Signals output from the electrostatic capacitance detecting circuit 431 are input into the control circuit 432. The structure of the control circuit 432 is identical to that of the control circuit 132 of the inertial drive actuator 100, and hence the explanation thereof is omitted. The inertial drive actuator device includes the inertial drive actuator 400, the electrostatic capacitance detecting circuit 431 and the driving circuit 433 that are connected to the inertial drive actuator 400, and the control circuit 432.

The electrostatic capacitance detecting circuit 431 detects the electrostatic capacitance between the oscillating plate position detecting electrode 416 and the moving body side electrode 422 as well as the electrostatic capacitance between the oscillating plate position detecting electrode 417 and the moving body side electrode 422. These electrostatic capacitances vary as the moving body 421 moves from one movement limit position to the other movement limit position. The electrostatic capacitance between the moving body side electrode 422 and either of the oscillating plate position detecting electrodes 416 and 417 can be used for detecting the position of the moving body 421.

By virtue of the above-described structure, a calibration identical to that of the inertial drive actuator 100 can be executed even in the inertial drive actuator 400, and consequently, even if the electrostatic capacitance between the moving body 421 and the oscillating plate driving electrode 411 differs at a later stage after the assembly of the actuator, it can be corrected to appropriate values. As a result, the absolute position of the moving body 421 can be reliably and accurately calculated.

(Fifth Embodiment)

Figure 16:
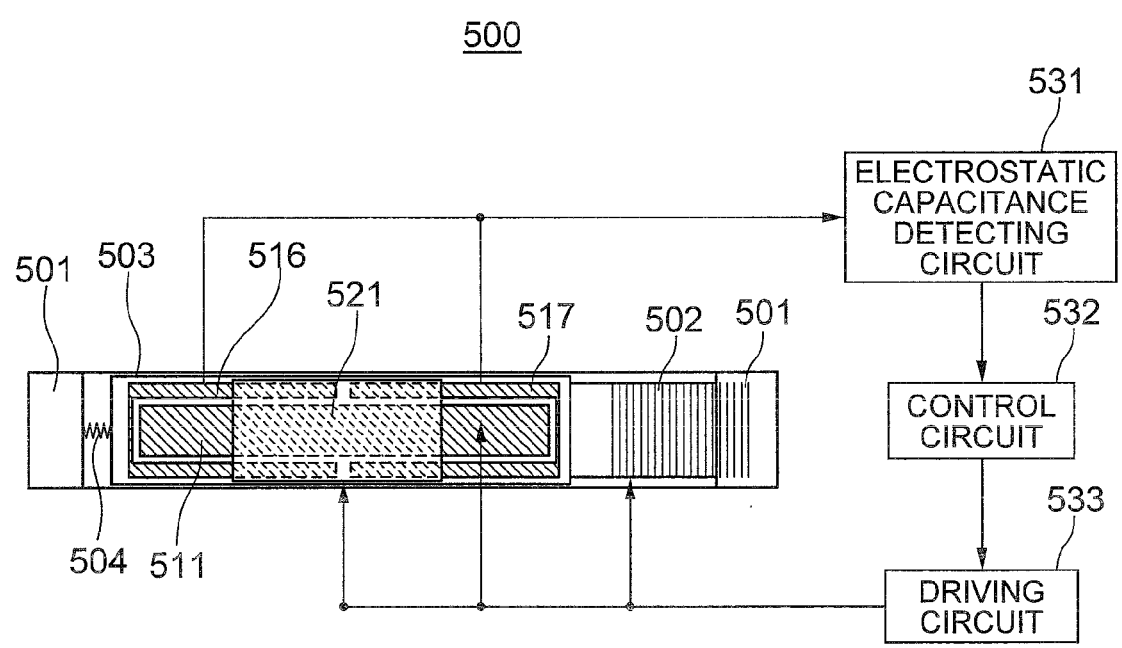
FIG. 16 is a plan-view depicting the structure of an inertial drive actuator device that includes an inertial drive actuator according to a fifth embodiment of the present invention.
Figure 17:
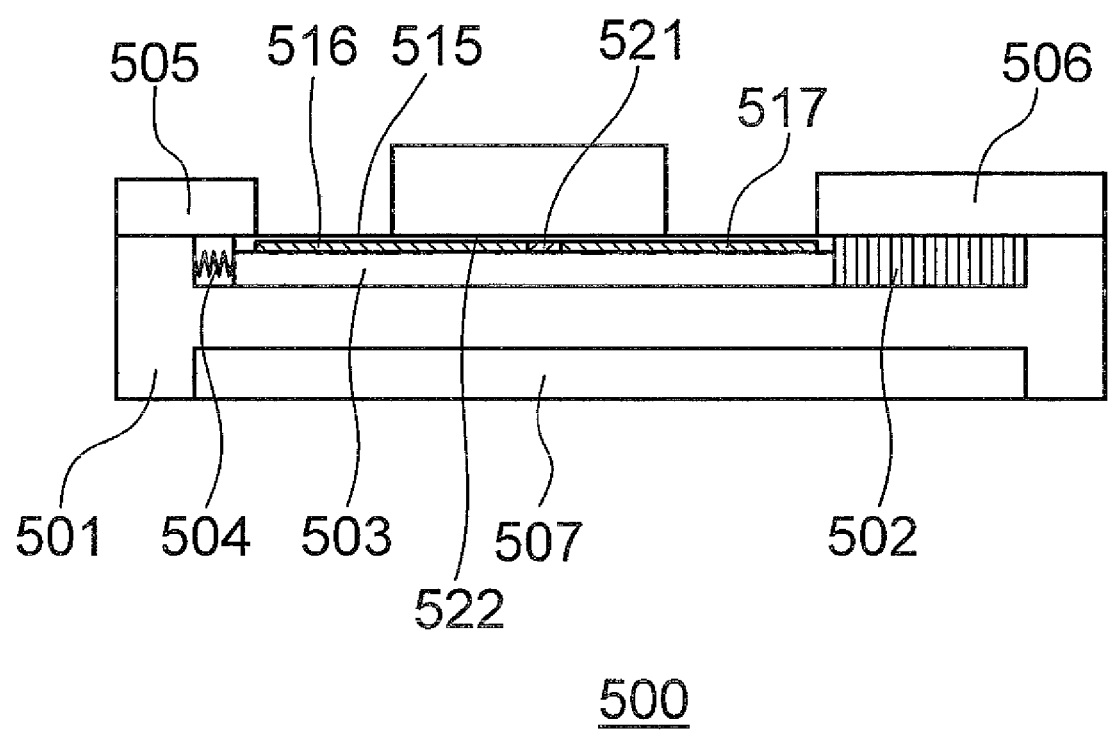
FIG. 17 is a side-view depicting the structure of the inertial drive actuator according to the fifth embodiment of the present invention.

The structure of an inertial drive actuator 500 according to a fifth embodiment is explained with reference to FIGS. 16 and 17. FIG. 16 is a plan-view depicting the structure of an inertial drive actuator device that includes the inertial drive actuator 500 according to the fifth embodiment of the present invention. FIG. 17 is a side-view depicting the structure of the inertial drive actuator 500. Attention is drawn to the fact that projecting sections 505 and 506 are not shown in FIG. 16.

The inertial drive actuator 500 according to the fifth embodiment differs from the inertial drive actuator 100 according to the first embodiment in that it includes an oscillating plate 503 on which are formed two oscillating plate position detecting electrodes 516 and 517, with an oscillating plate driving electrode 511 disposed therebetween, instead of the oscillating plate electrodes 111 and 112. The rest of the structure of the inertial drive actuator 500 is identical to that of the inertial drive actuator 100 according to the first embodiment.

Specifically, the oscillating plate position detecting electrodes 516 and 517 are U-shaped in a planar view and are disposed in such a way that their ends face each other. Furthermore, the oscillating plate driving electrode 511 has a planar shape of a rectangle and is disposed in an area between the oscillating plate position detecting electrodes 516 and 517, separating the oscillating plate position detecting electrodes 516 and 517.

Thus, a configuration has been adapted in which in a section midway between the first movement limit position and the second movement limit position the oscillating plate position detecting electrodes 516 and 517 are separated from each other. As a result, the values of electrostatic capacitance will vary significantly in this section, so that a center position between the first movement limit position and the second movement limit position can be easily detected.

The oscillating plate position detecting electrodes 516 and 517 should preferably be configured in such a way that the electrostatic capacitances between the moving body side electrode 522 of the moving body 521 and the oscillating plate position detecting electrodes 516 and 517 vary proportionally as the moving body 521 moves from one movement limit position to the other movement limit position. Further, the position of the moving body and the electrostatic capacitance should preferably have a proportional relationship in the movement range from one movement limit position to the other movement limit position. To achieve this, a slant can be given to the thickness of the oscillating plate position detecting electrodes 516 and 517 so that the distance between the moving body 521 with each of the oscillating plate position detecting electrodes 516 and 517 reduces as the moving body 521 moves from one movement limit position to the other movement limit position.

A fixed member 501, a piezoelectric element 502, a spring 504, the projecting sections 505 and 506, a permanent magnet 507, and the moving body 521 of the inertial drive actuator 500 are identical, respectively, to the fixed member 101, the piezoelectric element 102, the spring 104, the projecting sections 105 and 106, the permanent magnet 107, and the moving body 121 of the inertial drive actuator 100 according to the first embodiment, and hence the explanation thereof is omitted.

The oscillating plate driving electrode 511, and the oscillating plate position detecting electrodes 516 and 517 are formed on the upper surface of the oscillating plate 503, and an insulation layer 515 is formed on the upper surface of the oscillating plate driving electrode 511. The moving body 521 is mounted on the oscillating plate driving electrode 511, and the oscillating plate position detecting electrodes 516 and 517, with the insulation layer 515 disposed therebetween.

The moving body side electrode 522 is formed on the lower surface of the moving body 521, that is, on the surface that is in contact with each of the oscillating plate driving electrode 511, and the oscillating plate position detecting electrodes 516 and 517. With the displacement of the oscillating plate 503, the moving body 521 is capable of moving slidingly in relation to the insulation layer 515 in a longitudinal direction (left and right directions in FIGS. 16 and 17) of the oscillating plate 503 having a rectangular shape. The moving body 521 should preferably be made of a magnetic material or a conductive material.

A driving circuit 533 is connected to the piezoelectric element 502, the oscillating plate driving electrode 511, and the moving body side electrode 522 of the moving body 521, and applies a driving voltage to drive each of the piezoelectric element 502, the oscillating plate driving electrode 511, and the moving body side electrode 522. Furthermore, an electrostatic capacitance detecting circuit 531 is connected to each of the oscillating plate position detecting electrodes 516 and 517. The electrostatic capacitance detecting circuit 531 detects the electrostatic capacitance between the moving body side electrode 522 of the moving body 521 and the oscillating plate position detecting electrodes 516 and 517.

Signals output from the electrostatic capacitance detecting circuit 531 are input into the control circuit 52. The structure of the control circuit 532 is identical to that of the control circuit 132 of the inertial drive actuator 100, and hence the explanation thereof is omitted. The inertial drive actuator device includes the inertial drive actuator 500, the electrostatic capacitance detecting circuit 531 and the driving circuit 533 that are connected to the inertial drive actuator 500, and the control circuit 532.

The electrostatic capacitance detecting circuit 531 detects the electrostatic capacitance between the oscillating plate position detecting electrode 516 and the moving body side electrode 522 as well as the electrostatic capacitance between the oscillating plate position detecting electrode 517 and the moving body side electrode 522. These electrostatic capacitances vary as the moving body 521 moves from one movement limit position to the other movement limit position. The electrostatic capacitance between the moving body side electrode 522 and either of the oscillating plate position detecting electrodes 516 and 517 can be used for detecting the position of the moving body 521.

By virtue of the above-described structure, a calibration identical to that of the inertial drive actuator 100 can be executed even in the inertial drive actuator 500, and consequently, even if the electrostatic capacitance between the moving body 521 and the oscillating plate driving electrode 511 differs at stage after the assembly of the actuator, it can be corrected to appropriate values. As a result, the absolute position of the moving body 521 can be reliably and accurately calculated.

(Sixth Embodiment)

Figure 18:
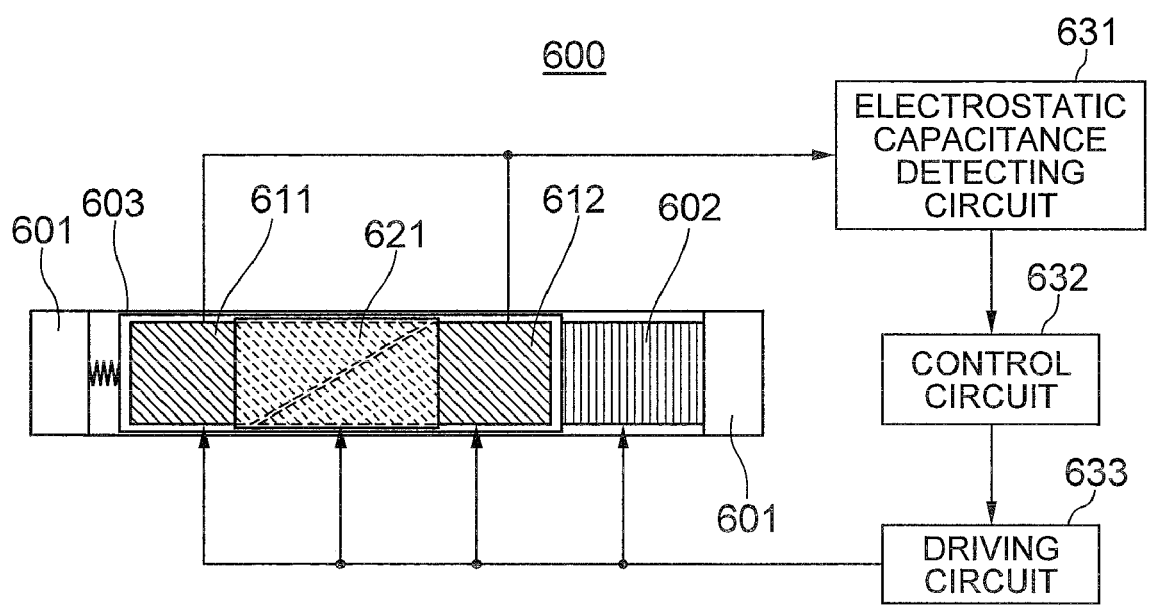
FIG. 18 is a plan-view depicting the structure of an inertial drive actuator device that includes an inertial drive actuator according to a sixth embodiment of the present invention.
Figure 19:
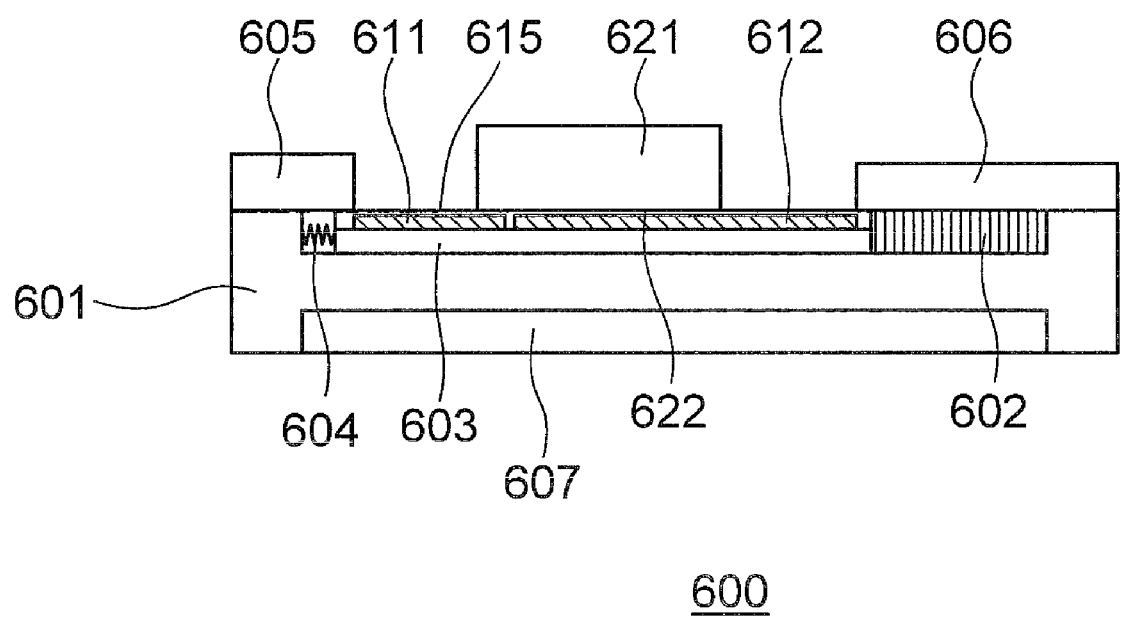
FIG. 19 is a side view depicting the structure of the inertial drive actuator according to the sixth embodiment of the present invention.
Figure 20:
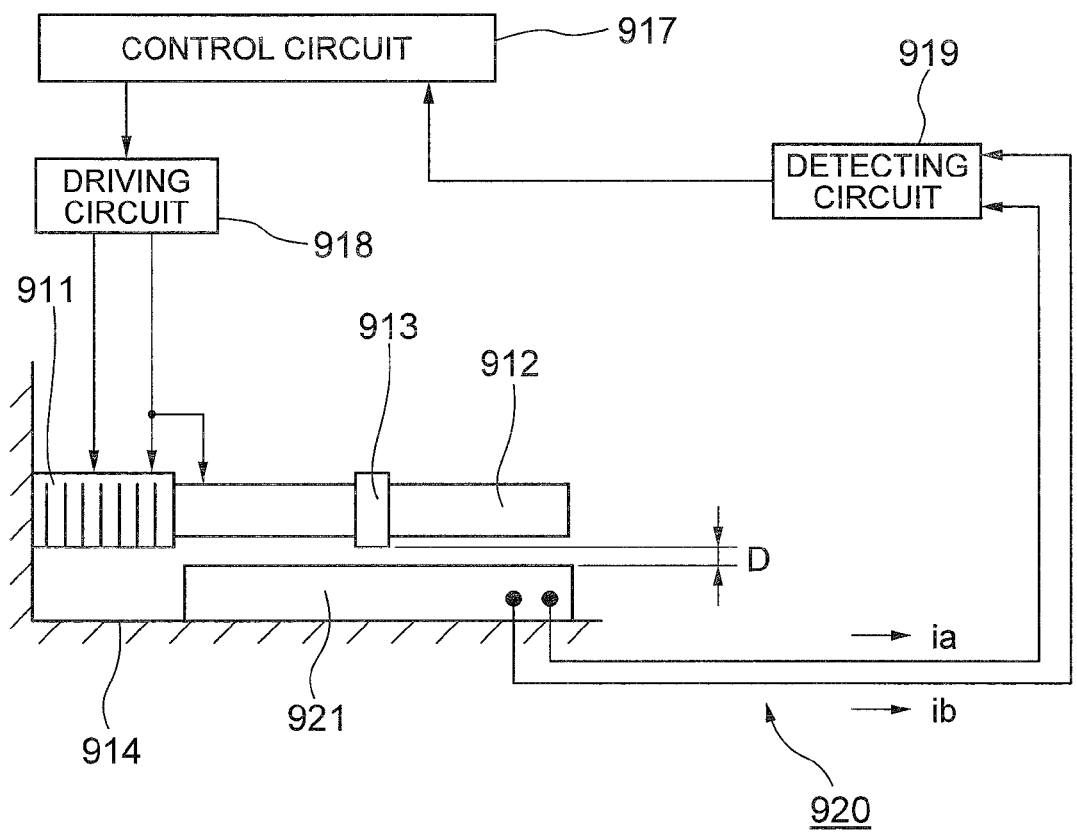
FIG. 20 is a side-view depicting the structure of a conventional actuator 920.
Figure 21:
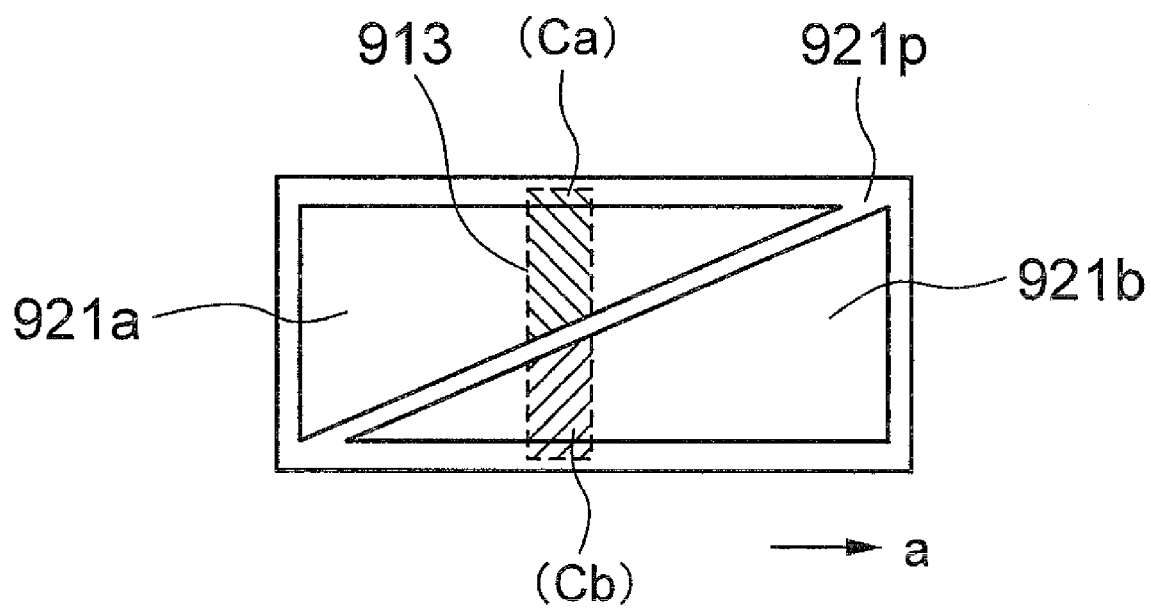
FIG. 21 is a plan-view depicting the structure of a detecting member and the relationship between the detecting member and a moving body.

The structure of an inertial drive actuator 600 according to a sixth embodiment is explained with reference to FIGS. 18 and 19. FIG. 18 is a plan-view depicting the structure of an inertial drive actuator device that includes the inertial drive actuator 600 according to the sixth embodiment of the present invention. FIG. 19 is a side-view depicting the structure of the inertial drive actuator 600. Attention is drawn to the fact that projecting sections 605 and 606 are not shown in FIG. 18.

The inertial drive actuator 600 according to the sixth embodiment differs from the inertial drive actuator 100 according to the first embodiment in that it includes two oscillating plate electrodes 611 and 612 whose oblique edges are trapezoidal in a planar view and are disposed face to face. In other words, a width of the oscillating plate electrode 611 on the oscillating plate electrode 612 side narrows from a spring 604 side to a piezoelectric element 602 side, and a width of the oscillating plate electrode 612 on the oscillating plate electrode 611 side narrows from the piezoelectric element 602 side to the spring 604 side. The rest of the structure of the inertial drive actuator 600 is identical to that of the inertial drive actuator 100 according to the first embodiment.

The oscillating plate electrodes 611 and 612 are configured in such a way that the electrostatic capacitances between the oscillating plate electrodes 611 and 612, and a moving body side electrode 622 of a moving body 621 increases as the moving body 621 moves from one movement limit position to the other movement limit position. Furthermore, the position of the moving body and the electrostatic capacitance should preferably have a proportional relationship in the movement range from one movement limit position to the other movement limit position. To achieve this, a slant can be given to the thickness of the oscillating plate electrodes 616 and 617 so that the distance between the moving body 621 with each of the oscillating plate electrodes 616 and 617 reduces as the moving body 621 moves from one movement limit position to the other movement limit position.

A fixed member 601, the piezoelectric element 602, the spring 604, the projecting sections 605 and 606, a permanent magnet 607, and the moving body 621 of the inertial drive actuator 600 are identical, respectively, to the fixed member 101, the piezoelectric element 102, the spring 104, the projecting sections 105 and 106, the permanent magnet 107, and the moving body 121 of the inertial drive actuator 100 according to the first embodiment, and hence the explanation thereof is omitted.

The oscillating plate electrodes 611 and 612 are formed on the upper surface of the oscillating plate 603, and an insulation layer 615 is formed on the upper surface of the oscillating plate electrodes 611 and 612. The moving body 621 is mounted on the oscillating plate electrodes 611 and 612, with the insulation layer 615 disposed therebetween. The moving body side electrode 622 is formed on the lower surface of the moving body 621, that is, on the surface that is in contact with the oscillating plate electrodes 611 and 612.

With the displacement of the oscillating plate 603, the moving body 621 is capable of moving slidingly in relation to the insulation layer 615 in a longitudinal direction (left and right directions in FIGS. 18 and 19) of the oscillating plate 603 having a rectangular shape. The moving body 621 should preferably be made of a magnetic material or a conductive material.

A driving circuit 633 is connected to the piezoelectric element 602, the oscillating plate electrodes 611 and 612, and the moving body side electrode 622 of the moving body 621, and applies driving voltage to drive each of the piezoelectric element 602, the oscillating plate electrodes 611 and 612, and the moving body side electrode 622. Furthermore, an electrostatic capacitance detecting circuit 631 is connected to each of the oscillating plate electrodes 611 and 612, and detects the electrostatic capacitance between the moving body side electrode 622 of the moving body 621 and the plate electrodes 611 and 612.

Signals output from the electrostatic capacitance detecting circuit 631 are input into the control circuit 632. The structure of the control circuit 632 is identical to that of the control circuit 132 of the inertial drive actuator 100, and hence the explanation thereof is omitted. The inertial drive actuator device includes the inertial drive actuator 600, the electrostatic capacitance detecting circuit 631 and the driving circuit 633 that are connected to the inertial drive actuator 600, and the control circuit 632.

The electrostatic capacitance detecting circuit 631 detects the electrostatic capacitance between the oscillating plate electrode 611 and the moving body side electrode 622 as well as the electrostatic capacitance between the oscillating plate electrode 612 and the moving body side electrode 622. These electrostatic capacitances vary as the moving body 621 moves from one movement limit position to the other movement limit position.

By virtue of the above-described structure, a calibration identical to that of the inertial drive actuator 100 can be executed even in the inertial drive actuator 600, and consequently, even if the electrostatic capacitances between the moving body 621 and the oscillating plate electrodes 611 and 612 differ at a later stage after the assembly of the actuator, they can be corrected to appropriate values. As a result, the absolute position of the moving body 621 can be reliably and accurately calculated.

The inertial drive actuator according to the present invention can be used in gadgets that require minute displacement of a moving body.

In a calibration method for inertial drive actuator and an inertial drive actuator device according to the present invention, even if an electrostatic capacitance between a moving body and an electrode differs at a later stage after the assembly of the actuator, it can be corrected to an appropriate value. As a result, an absolute position of the moving body can be reliably and accurately calculated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A calibration method for an inertial drive actuator wherein a moving body is driven to move by inertia between a first movement limit position and a second movement limit position in relation to an oscillating plate that is moved to reciprocate by a moving member, and wherein a position of the moving body is detected based on an electrostatic capacitance, the calibration method comprising steps of:

detecting at the first movement limit position with a detecting circuit and at the second movement limit position with the detecting circuit electrostatic capacitances of opposing parts of a moving body side electrode provided in the moving body and an oscillating plate electrode provided in the oscillating plate;

storing with a storage unit, the electrostatic capacitances at the first movement limit position and the second movement limit position detected at the detecting step with the detecting circuit; and calculating with a ratio calculating unit, a ratio of a difference between the electrostatic capacitances at the first movement limit position and the second movement limit position stored at the storing step with the storage unit to a movement limit distance that is a distance between the first movement limit position and the second movement limit position;

wherein an absolute position of the moving body between the first movement limit position and the second movement limit position can be determined by using the ratio calculated at the calculating step with the ratio calculating unit.

2. The calibration method for inertial drive actuator according to claim 1, wherein a position of the moving body in a movement range from the first movement limit position to the second movement limit position, and the electrostatic capacitances have a proportional relationship.

3. The calibration method for inertial drive actuator according to claim 1, further comprising a step of comparing in which, the electrostatic capacitances stored at the storing step are compared.

4. The calibration method for inertial drive actuator according to claim 1, wherein recalibration is induced when the electrostatic capacitance varies and an error is detected in a relationship between position data and the electrostatic capacitance even if the moving body is idle in absence of an input signal.

5. The calibration method for inertial drive actuator according to claim 1, wherein a movement amount per driving waveform when the moving body is moved from the first movement limit position toward the second movement limit position and a movement amount per driving waveform when the moving body is moved from the second movement limit position toward the first movement limit position is measured or calculated, and one of the movement amount per driving waveforms is stored or both the movement amount per driving waveforms are stored separately.

6. The calibration method for inertial drive actuator according to claim 5, wherein when calculating the movement amount per driving waveform, the moving body is moved at least once toward a center in a movement range from the first movement limit position to the second movement limit position.

7. The calibration method for inertial drive actuator according to claim 1, wherein the oscillating plate electrode is provided in a plurality, and the position of the moving body is calculated by comparing or calculating electrostatic capacitances between the moving body side electrode and the respective oscillating plate electrodes.

8. The calibration method for inertial drive actuator according to claim 1, wherein the oscillating plate electrode includes any one of a driving electrode and a position detecting electrode or both.

9. The calibration method for inertial drive actuator according to claim 1, further comprising a step of confirming in which, a calibration result is confirmed.

10. The calibration method for inertial drive actuator according to claim 9, wherein recalibration is performed if it is confirmed at the confirming step that calibration is not performed correctly.

11. An inertial drive actuator device comprising:
   an oscillating plate that is moved to reciprocate by a moving member;
   a driving circuit that applies a drive signal to the moving member;
   a moving body that moves by inertia in relation to the oscillating plate;
   projecting sections that regulate a movement limit distance of the moving body;
   an electrostatic capacitance detecting circuit that detects an electrostatic capacitance of an opposing portion of a moving body side electrode provided in the moving body and an oscillating plate electrode provided in the oscillating plate;
   an electrostatic capacitance storage unit that stores therein the electrostatic capacitance detected by the electrostatic capacitance detecting circuit;
   a ratio calculating unit that calculates a ratio of the electrostatic capacitance stored in the electrostatic capacitance storage unit to the movement limit distance; and
   an absolute-position calculating unit that calculates an absolute position of the moving body based on the electrostatic capacitance detected by the electrostatic capacitance detecting circuit and the ratio calculated by the ratio calculating unit.

12. The inertial drive actuator device according to claim 11, wherein the moving body includes a conductive material.

13. The inertial drive actuator device according to claim 11, wherein a permanent magnet is disposed on a side of the oscillating plate facing the moving body, and the moving body includes a magnetic material.

14. A method of calculating a position of a moving body in an inertial drive actuator wherein the moving body is driven to move by inertia between a first movement limit position and a second movement limit position in relation to an oscillating plate that is moved to reciprocate by a moving member, and wherein a position of the moving body is detected based on an electrostatic capacitance, the method comprising steps of:

detecting at the first movement limit position with a detecting circuit and at the second movement limit position with the detecting circuit electrostatic capacitances of opposing parts of a moving body side electrode provided in the moving body and an oscillating plate electrode provided in the oscillating plate;

storing with a storage unit, the electrostatic capacitances at the first movement limit position and the second movement limit position detected at the detecting step with the detecting circuit;

calculating with a ratio calculating unit, a ratio of a difference between the electrostatic capacitances at the first movement limit position and the second movement limit position stored at the storing step with the storage unit to a movement limit distance that is a distance between the first movement limit position and the second movement limit position; and calculating with an absolute-position calculating unit, an absolute position of the moving body between the first movement limit position and the second movement limit position from the ratio calculated at the calculating step with the ratio calculating unit.

* * * * *